US012639203B2

(12) United States Patent
Shin et al.

(10) Patent No.: US 12,639,203 B2
(45) Date of Patent: May 26, 2026

(54) METHOD AND DEVICE WITH DYNAMIC ADJUSTMENT OF SWAPPING

(71) Applicants:SAMSUNG ELECTRONICS CO., LTD., Suwon-si (KR); UNIST (ULSAN NATIONAL INSTITUTE OF SCIENCE AND TECHNOLOGY), Ulsan (KR)

(72) Inventors: Youngsam Shin, Suwon-si (KR); Woongki Baek, Ulsan (KR); Myeonggyun Han, Ulsan (KR); Deok Jae Oh, Suwon-si (KR); Eunseong Park, Ulsan (KR)

(73) Assignees: Samsung Electronics Co., Ltd., Suwon-si (KR); UNIST (Ulsan National Institute of Science and Technology), Ulsan (KR)

( * ) Notice: Subject to any disclaimer, the term of this patent is extended or adjusted under 35 U.S.C. 154(b) by 0 days.

(21) Appl. No.: 18/494,476

(22) Filed: Oct. 25, 2023

(65) Prior Publication Data

US 2024/0320139 A1 Sep. 26, 2024

(30) Foreign Application Priority Data

Mar. 21, 2023 (KR) ........................ 10-2023-0036585

(51) Int. Cl.
*G06F 12/02* (2006.01)
(52) U.S. Cl.
CPC .................................. *G06F 12/023* (2013.01)
(58) Field of Classification Search
None
See application file for complete search history.

(56) References Cited

U.S. PATENT DOCUMENTS 9,256,532 B2 2/2016 Li et al.
9,600,317 B2 3/2017 Guo et al.
(Continued)

FOREIGN PATENT DOCUMENTS

KR 10-2017-0092912 A 8/2017
KR 10-2021-0122663 A 10/2021
KR 10-2021-0155059 A 12/2021

OTHER PUBLICATIONS

Hwang, Jeaho, et al. "Compressed memory swap for QoS of virtualized embedded systems." IEEE Transactions on Consumer Electronics 58.3 (2012): 834-840.
(Continued)

*Primary Examiner* — Charles J Choi
(74) *Attorney, Agent, or Firm* — NSIP Law

(57) ABSTRACT

A method, for managing a virtual memory using a first memory including a main memory space and a first swap pool and a second memory including a second swap pool, includes: based on a quality of service (QoS) of tasks or on a system efficiency corresponding to execution of the tasks, adaptively adjusting a distribution state of the first memory or a size of the first swap pool; and based on the adaptively adjusted distribution state of the first memory or the adaptively adjusted size of the first swap pool, performing swap-out of a first page of the tasks from the main memory space to the first swap pool or the second swap pool or performing swap-in of a second page of the tasks from the first swap pool or the second swap pool to the main memory space.

19 Claims, 11 Drawing Sheets

(56)                References Cited

U.S. PATENT DOCUMENTS

| | | |
|---|---|---|
| 10,565,099 B2 | 2/2020 | Sokol, Jr. |
| 2010/0023565 A1 | 1/2010 | Colbert et al. |
| 2015/0242231 A1* | 8/2015 | Chen .................... G06F 3/0619 |
| | | 711/162 |
| 2016/0098203 A1 | 4/2016 | Chang et al. |

OTHER PUBLICATIONS

Korean Office Action issued on Oct. 2, 2024, in counterpart Korean Patent Application No. 10-2023-0036585 (4 pages in English, 8 pages in Korean).
Extended European search report issued on Oct. 9, 2024, in counterpart European Patent Application No. 24164933.4 (11 pages).
Lagar-Cavilla et al. "Software-Defined Far Memory in Warehouse-Scale Computers" *Proceedings of the Twenty-Fourth International Conference on Architectural Support for Programming Languages and Operating Systems.* Apr. 13-17, 2019 (pp. 317-330).
Kim et al. "RapidSwap: A Hierarchical Far Memory" *International Conference on the Economics of Grids, Clouds, Systems, and Services.* Cham: Springer International Publishing, 2021 (pp. 1-8).
Weiner et al. "TMO: Transparent Memory Offloading in Datacenters" *Proceedings of the 27th ACM International Conference on Architectural Support for Programming Languages and Operating Systems.* Feb. 28-Mar. 4, 2022 (pp. 609-621).
Extended European search report issued on Jul. 17, 2024, in counterpart European Patent Application No. 24164933.4 (14 pages).

* cited by examiner

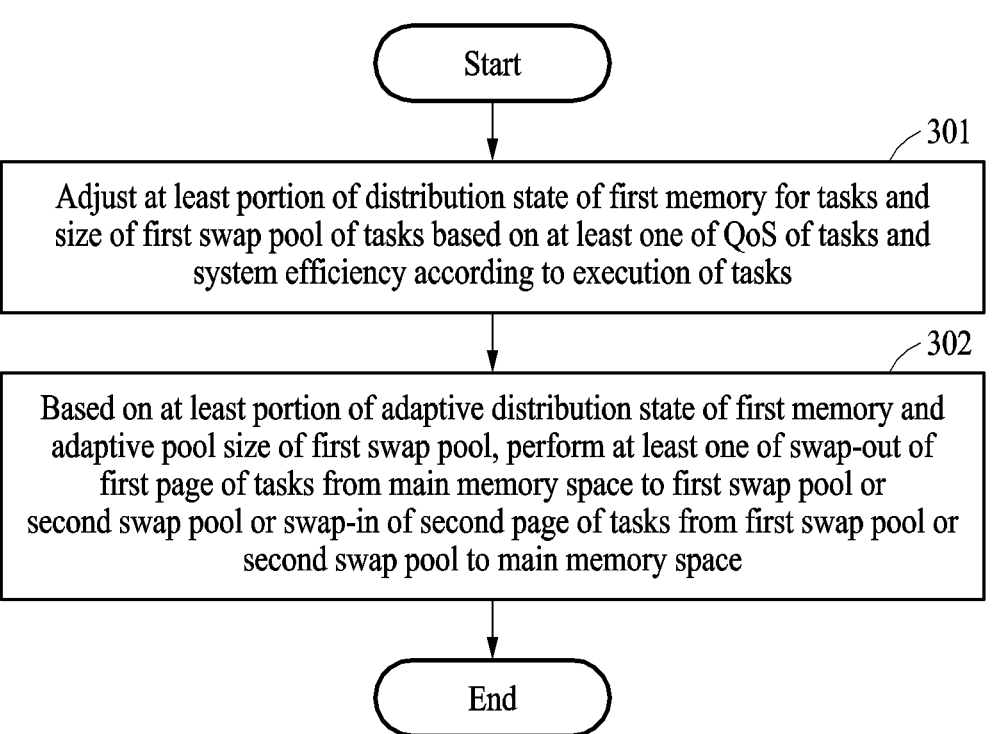

Start

301

Adjust at least portion of distribution state of first memory for tasks and size of first swap pool of tasks based on at least one of QoS of tasks and system efficiency according to execution of tasks

302

Based on at least portion of adaptive distribution state of first memory and adaptive pool size of first swap pool, perform at least one of swap-out of first page of tasks from main memory space to first swap pool or second swap pool or swap-in of second page of tasks from first swap pool or second swap pool to main memory space End

FIG. 3

METHOD AND DEVICE WITH DYNAMIC ADJUSTMENT OF SWAPPING

CROSS-REFERENCE TO RELATED APPLICATIONS

This application claims the benefit under 35 USC § 119(a) of Korean Patent Application No. 10-2023-0036585, filed on Mar. 21, 2023, in the Korean Intellectual Property Office, the entire disclosure of which is incorporated herein by reference for all purposes.

BACKGROUND

1. Field

The following description relates to a method of managing a memory and a device using the method.

2. Description of Related Art

Memory swapping allows a computer operating system, for example, to provide a virtual memory with an address space that is significantly larger than the physical memory (e.g., a main/host storage device) backing the virtual memory. When a system is low on physical memory in RAM, some pieces of data in the RAM may be temporarily moved, as swap data, to an auxiliary storage device (e.g., a solid state drive (SDD)) serving as a swap device. This allows the system to continue running. Through memory swapping, an effect of adding more physical memory (without having to do so) may be exhibited and the system may use a swap space as a virtual memory. Accessing a space or device in which swap data is usually slower than accessing data stored in RAM. Memory swapping is an aspect of operating systems, for example, that may be used to efficiently manage memory resources and provide a trade-off between performance and memory usage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is a method of managing a virtual memory using a first memory including a main memory space and a first swap pool and a second memory including a second swap pool, and the method includes: based on a quality of service (QoS) of tasks or on a system efficiency corresponding to execution of the tasks, adaptively adjusting a distribution state of the first memory or a size of the first swap pool; and based on the adaptively adjusted distribution state of the first memory or the adaptively adjusted size of the first swap pool, performing swap-out of a first page of the tasks from the main memory space to the first swap pool or the second swap pool or performing swap-in of a second page of the tasks from the first swap pool or the second swap pool to the main memory space.

The performing of the swap-out of the first page or the swap-in of the second page includes: based on a characteristic of the first page, the first swap pool, or the second swap pool, selecting, from among the first swap pool and the second swap pool, a target swap pool of the first page for performing the swap-out of the first page; and performing the swap-out of the first page based on the selected target swap pool of the first page.

The selecting of the target swap pool of the first page may include: based on the characteristic of the first page, the first swap pool, or the second swap pool, determining a first score of the first page; and selecting the target swap pool of the first page according to a result of comparing the first score of the first page to a first threshold value.

The first swap pool may include a compressed swap pool wherein pages are compressed when written to the first swap pool and wherein pages are decompressed when read from the first swap pool.

The performing of the swap-out of the first page or the swap-in of the second page may include: based on a characteristic of the second page, the first swap pool, or the second swap pool, determining a swap-in type of the second page, the swap-in type corresponding to whether to duplicatively store the second page in the main memory space and in a swap pool which can be either the first swap pool or the second swap pool; and performing the swap-in of the second page based on the determined swap-in type of the second page.

The determining of the swap-in type of the second page may include: based on the characteristic of the second page, the first swap pool, or the second swap pool, determining a second score of the second page; and determining the swap-in type of the second page according to a result of comparing the second score of the second page to a second threshold value, and wherein the second score is proportional to hotness of the second page, a compression ratio of the second page, and an available space of the swap pool storing the second page, and wherein the second score is inversely proportional to performance of a swap pool storing the second page.

The determining of the swap-in type of the second page may include: in response to the swap-in of the second page occurring due to a memory fault in the main memory space caused by a write operation on the second page, determining the swap-in type of the second page to be a single-storage type for the main memory space.

The adaptively adjusting the distribution state of the first memory or the size of the first swap pool may include: determining, in an adaptation mode, the adaptive distribution state of the first memory and the adaptive pool size of the first swap pool based on a change of the QoS and the system efficiency resulting from adjustment of the distribution state of the first memory and the size of the first swap pool; monitoring, in an idle mode, a change of the QoS or the system efficiency while operating the first memory and the first swap pool in the adaptive distribution state with the adaptive pool size; and performing the adaptation mode again based on the change of the QoS or the system efficiency.

The tasks may include a first task having a required QoS level and a second task not having the required QoS level, and wherein the determining of the adaptive distribution state of the first memory and the adaptive pool size of the first swap pool may include: in response to a first QoS value of the first task satisfying the required QoS level of the first task, varying a first adaptive memory size of a first partial space of the first task while reducing a size of the first partial space in the first memory for the first task; and in response to the first QoS value not satisfying the required QoS level according to the varying of the first adaptive memory size, varying a first adaptive pool size of the first task while adjusting a size of a first partial pool in the first swap pool for the first task.

The determining of the adaptive distribution state of the first memory and the adaptive pool size of the first swap pool may include: determining a second adaptive memory size of a second partial space in the first memory for the second task based on a difference between a size of the first memory and the first adaptive memory size of the first partial space; and varying a second adaptive pool size of the second task while adjusting a size of a second partial pool in the first swap pool for the second task so that the system efficiency increases in a state where the first QoS value satisfies the required QoS level.

The adaptively adjusting of the distribution state of the first memory or the size of the first swap pool may include: in response to an indication that the size of the first swap pool is to be reduced, selecting a victim page from among pages stored in the first swap pool; and performing eviction on the victim page.

The performing of the eviction on the victim page may include: based on whether the victim page is a duplicated page or not, determining whether to evict the victim page by performing invalidation on the victim page or whether to evict the victim page by storing the victim page in the second swap pool.

In another general aspect, an electronic device includes: a processor and memory storing instructions configured to cause the processor to: based on a quality of service (QoS) of tasks or on a system efficiency corresponding to execution of the tasks, adaptively adjust a portion of a distribution state of the first memory or a size of the first swap pool; and based on the adaptively adjusted distribution state of the first memory or the adaptively adjusted size of the first swap pool, perform swap-out of a first page of the tasks from the main memory space to the first swap pool or the second swap pool or perform swap-in of a second page of the tasks from the first swap pool or the second swap pool to the main memory space.

The instructions may be configured to cause the processor to, in order to perform the swap-out of the first page or the swap-in of the second page: based on a characteristic the first page, the first swap pool, or the second swap pool, select, from among the first swap pool and the second swap pool, a target swap pool of the first page for performing the swap-out of the first page; and perform the swap-out of the first page based on the selected target swap pool of the first page.

Pages may be compressed when provided to the first swap pool and may be decompressed when obtained from the first swap pool.

The instructions may be further configured to cause the processor to, in order to perform the swap-out of the first page or the swap-in of the second page: based on a characteristic of the second page, the first swap pool, or the second swap pool, determine a swap-in type of the second page, the swap-in type corresponding to whether to duplicatively store the second page in both the main memory space and either the first swap pool or the second swap pool; and perform the swap-in of the second page based on the determined swap-in type of the second page.

The instructions may be further configured to cause the processor to, in order to adaptively adjust the distribution state of the first memory or the size of the first swap pool: determine, in an adaptation mode, the adaptive distribution state of the first memory and the adaptive pool size of the first swap pool based on a change of the QoS or the system efficiency resulting from adjustment of the distribution state of the first memory and the size of the first swap pool; monitor, in an idle mode, a change of the QoS or the system efficiency while operating the first memory and the first swap pool in the adaptive distribution state with the adaptive pool size; and perform the adaptation mode again based on the change of the QoS or the system efficiency.

The tasks may include a first task having a required QoS level and a second task not having the required QoS level, and the instructions may be further configured to cause the processor to, to determine the adaptive distribution state of the first memory and the adaptive pool size of the first swap pool: in response to a first QoS value of the first task satisfying the required QoS level of the first task, vary a first adaptive memory size of a first partial space of the first task while reducing a size of the first partial space in the first memory for the first task; in response to the first QoS value not satisfying the required QoS level according to the adjustment of the first adaptive memory size, vary a first adaptive pool size of the first task while adjusting a size of a first partial pool in the first swap pool for the first task; determine a second adaptive memory size of a second partial space in the first memory for the second task based on a difference between a size of the first memory and the first adaptive memory size of the first partial space; and explore a second adaptive pool size of the second task while adjusting a size of a second partial pool in the first swap pool for the second task so that the system efficiency increases in a state where the first QoS satisfies the first required QoS level.

The instructions may be further configured to cause the processor to adaptively adjust the distribution state of the first memory or the size of the first swap pool by: in response to an indication that the size of the first swap pool is to be reduced, select a victim page from among pages stored in the first swap pool; and perform eviction on the victim page.

In another general aspect, an electronic device includes: a first memory including a main memory space and a first swap pool; a second memory including a second swap pool; and a processor configured to: based on a characteristic of a first page, the first swap pool, or the second swap pool, select, according to swap-out of the first page, a target swap pool from among the first swap pool and the second swap pool; and perform swap-out of the first page based on the selected target swap pool.

The processor may be configured to, in order to select the target swap pool: based on the characteristic of the first page, the first swap pool, or the second swap pool, determine a first score of the first page; and select the target swap pool according to a result of comparing the first score of the first page to a first threshold value, and wherein the first score is proportional to hotness of the first page, a compression ratio of the first page, performance of the first swap pool, and available space of the first swap pool.

In another general aspect, an electronic device includes: a first memory including a main memory space and a first swap pool; a second memory including a second swap pool; and a processor configured to: based on a characteristic of a second page, the first swap pool, or the second swap pool, determine a swap-in type of the second page, the swap-in type corresponding to whether to duplicatively store the second page in the main memory space and a swap pool, where the swap pool can be either of the first swap pool or the second swap pool; and perform swap-in of the second page based on the determined swap-in type of the second page.

The processor may be configured to, in order to determine the swap-in type of the second page: based on the characteristic of the second page, the first swap pool, or the second swap pool, determine a second score of the second page; and determine a swap-in type of the second page according to a result of comparing the second score of the second page to a second threshold value, and wherein the second score is proportional to hotness of the second page, a compression ratio of the second page, an available space of the swap pool storing the second page, and wherein the second score inversely proportional to performance of a swap pool storing the second page.

The processor may be configured to, in order to determine the swap-in type of the second page: in response to the swap-in of the second page occurring due to a memory fault in the main memory space, determine the swap-in type of the second page as a single storage type for the main memory space, wherein the memory fault occurs due to a write operation on the second page.

Other features and aspects will be apparent from the following detailed description, the drawings, and the claims.

BRIEF DESCRIPTION OF THE DRAWINGS

FIG. 3 illustrates an example of operations of memory swapping including adjustment of a swap pool size, swap-out, and swap-in, according to one or more embodiments.

Figure 1A:
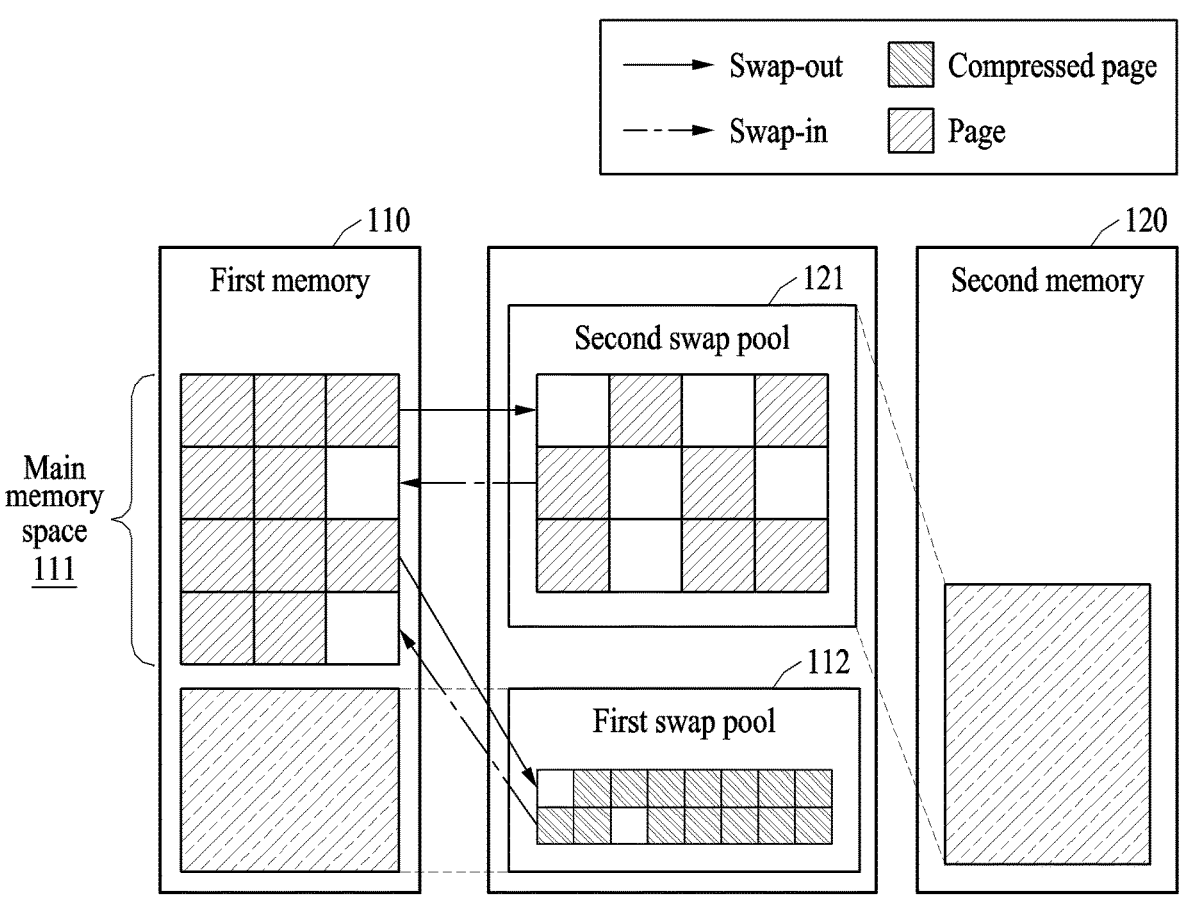
FIG. 1A illustrates an example of swap-related movement of pages, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1A illustrates an example of swap-related movement of pages, according to one or more embodiments. Recently, with an increase in memory-intensive workloads such as machine learning, big data, and in-memory key-value stores, memory requirements are rapidly increasing. These memory requirements may be satisfied in a cost-effective manner through memory swapping. Through memory swapping (which is also referred to herein as "swap"), a page of a memory (e.g., a first memory 110) may be swapped out, i.e., moved from a host/main memory to a swap pool (e.g., a first swap pool 112 or a second swap pool 121), and data stored in the memory may be stored in a compressed memory (e.g., the first swap pool 112) or a disk (e.g., the second swap pool 121). The term "compressed memory" or "memory compression", discussed further below, may refer to a technology for compressing data (e.g., a page) in a physical memory device. Efficient execution of workloads with large-capacity working-sets may be supported through swapping.

A swap pool for memory swapping may include a swap backend such as disk swap or compressed memory swap (CMS). The disk swap may be a swap backend that uses a disk device such as a hard disk drive (HDD) or a solid state drive (SDD) as a swap space. The CMS may be a swap backend that uses a compressed memory as a swap space. For use of the CMS, a page may be compressed before being stored in a memory space of the CMS. Disk input/output (I/O) may be reduced and some aspects of performance may be improved through the CMS.

Referring to FIG. 1A, the first memory 110 may include a main memory space 111 and the first swap pool 112. A second memory 120 may include the second swap pool 121. Each of the main memory space 111 and the first swap pool 112 may be formed in a physical area of the first memory 110. The second swap pool 121 may be formed in a physical area of the second memory 120. The first swap pool 112 may correspond to a CMS backend, and the second swap pool 121 may correspond to a disk swap backend.

The second memory 120 may be located farther (in terms of latency) from a processor than the first memory 110. Accessing a page of the first memory 110 by a processor may take less time and/or cost than accessing a page of the second memory 120. For example, the first memory 110 may correspond to a main storage device (e.g., a random access memory (RAM)), and the second memory 120 may correspond to an auxiliary storage device (e.g., a disk such as a hard disk drive (HDD) or a solid state drive (SDD)).

The first swap pool 112 may store compressed pages. In order for a page to be swapped out from the main memory space 111 and in to the first swap pool 112, compression of the page may be required (before it is stored in the first swap pool 112), and in order for a compressed page to be swapped out from the first swap pool 112 and in to the main memory space 111, decompression of the compressed page may be required (before it is stored in the main memory space 111). The second swap pool 121 may store uncompressed pages. Pages may be swapped in and out of the second swap pool 121 without requiring compression and decompression.

Workloads with large-capacity working-sets (data sets) may be efficiently executed through swapping technology. According to examples, a size of a swap pool (e.g., the first swap pool 112) may be adaptively adjusted. Also, according to examples, when swap-out and/or the swap-in is performed, characteristics of a page and/or characteristics of a swap pool (e.g., the first swap pool 112 or the second swap pool 121) may be considered and may affect how swapping is performed (e.g., which swap pool a page is swapped out to). According to examples, a quality of service (QoS) of workloads may be ensured or system efficiency may be optimized through such size adjustment of the swap pool or characteristics-based swap-in and swap-out.

Figure 1B:
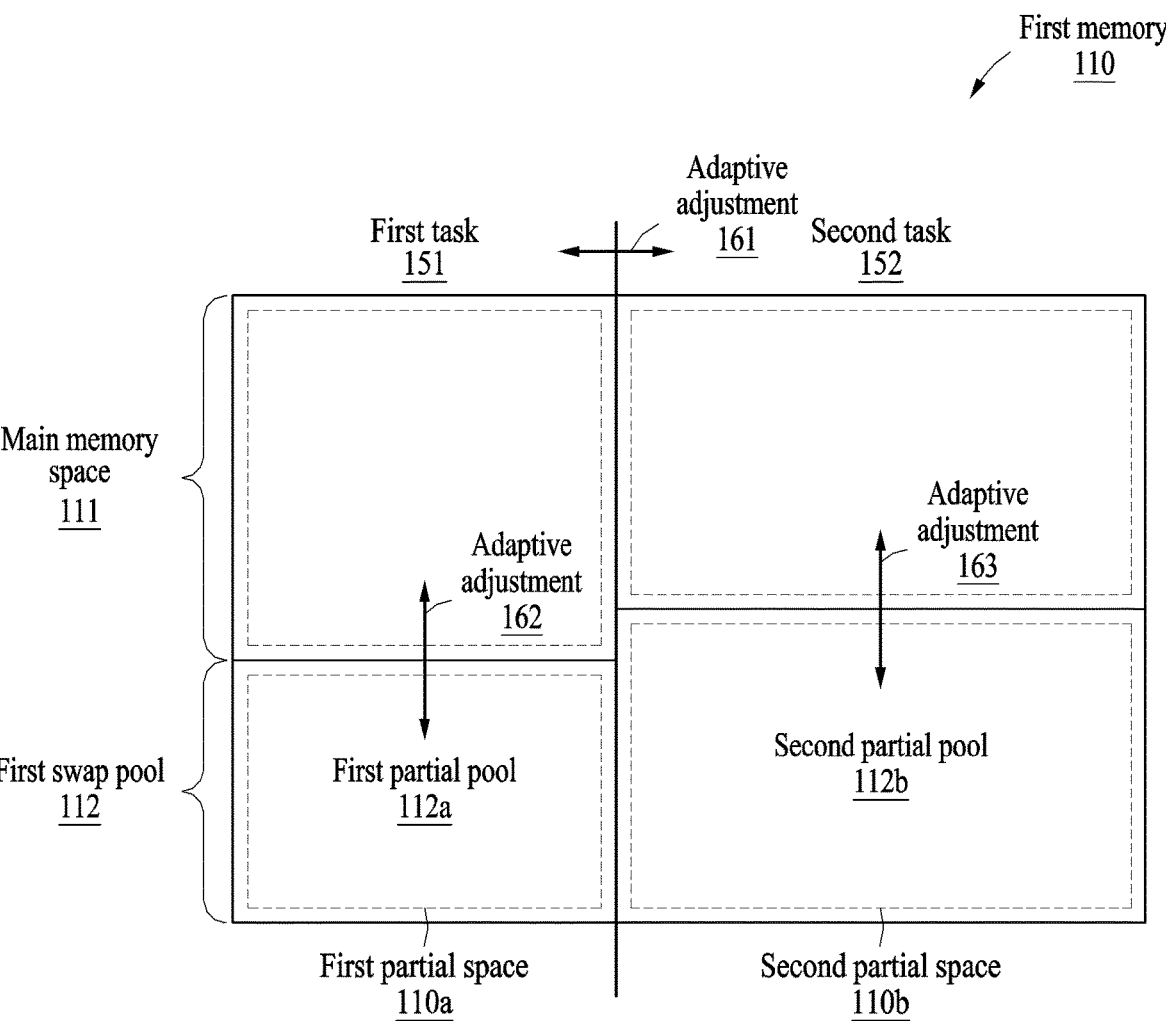
FIG. 1B illustrates an example of sub-areas of a first memory for different tasks, according to one or more embodiments.

FIG. 1B illustrates an example of sub-areas of a first memory for different tasks, according to one or more embodiments. Referring to FIG. 1B, when a plurality of tasks such as a first task 151 and a second task 152 are executed, the first memory 110 may be divided into partial spaces such as a first partial space 110a and a second partial space 110b and assigned to the plurality of tasks (a task may be an application, a thread, a process, or groups of any thereof, etc.). The first task 151 may correspond to a task of a first type having a required QoS level, and the second task 152 may correspond to a task of a second type not having the required QoS level. A required QoS level may refer to a minimum QoS level required for a corresponding workload and/or a corresponding task. Accordingly, in the case of a task having the required QoS level, performance satisfying the QoS level needs to be provided. For example, the first task 151 may correspond to a latency-critical (LC) task, and the second task 152 may correspond to a batch task. The first task 151 and the second task may be for the same workload or for different workloads.

According to an example, through operation 161 of adaptive adjustment, a distribution state of the first partial space 110a in the first memory 110 for the first task 151 and the second partial space 110b in the first memory 110 for the second task 152 may be optimized. Operation 161 of adaptive adjustment for the distribution state of the first partial space 110a and the second partial space 110b may include size adjustment of the first partial space 110a and size adjustment of the second partial space 110b. A size of the first partial space 110a may be minimized under the condition that the size allows the QoS of the first task 151 to satisfy the required QoS level. A portion in the first memory 110 excluding the first partial space 110a may be allocated as the second partial space 110b.

According to an example, the size of the first swap pool 112 in the first memory 110 may be optimized through operations 162 and 163 of adaptive adjustment. The size adjustment of the first swap pool 112 may include operation 162 of adaptive adjustment of a first partial pool 112a in the first swap pool 112 for the first task 151 and operation 163 of adaptive adjustment of a second partial pool 112b in the first swap pool 112 for the second task 152. The size of the first partial pool 112a may be adjusted to increase the QoS. the size of the second partial pool 112b may be adjusted so that the system efficiency is optimized while the adjusted size allows the QoS of the first task 151 to satisfy the required QoS level. Operations 161, 162, and 163 of adaptive adjustment are described below in more detail.

Figure 2:
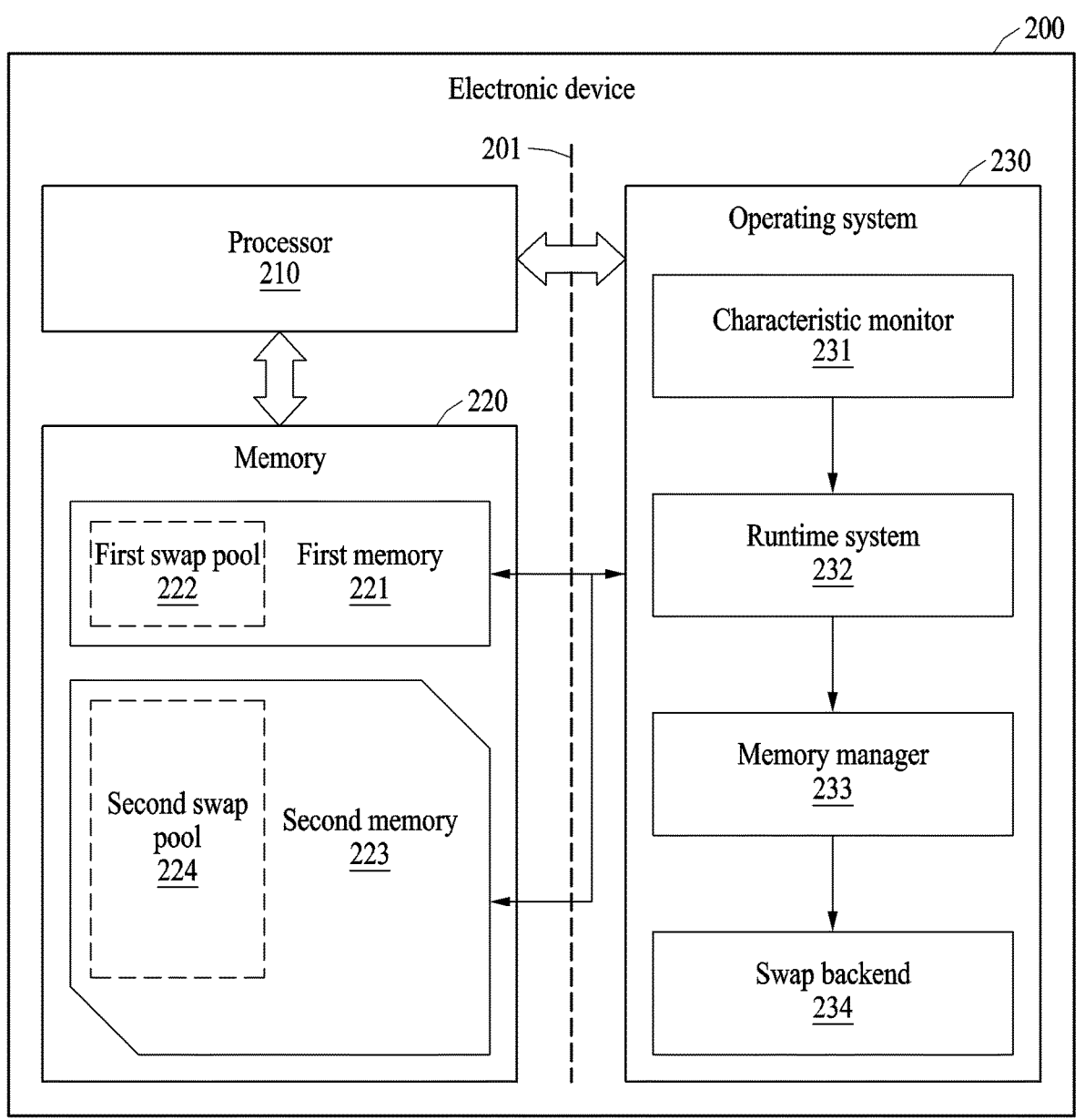
FIG. 2 illustrates example components for performing memory swapping, according to one or more embodiments.

FIG. 2 illustrates example components for performing memory swapping, according to one or more embodiments. Referring to FIG. 2, an electronic device 200 may include a processor 210 and a memory 220. The electronic device 200 may operate an operating system 230 using the processor 210 and the memory 220 and manage the memory 220 using the operating system 230. A left side of FIG. 2 with respect to a dotted line 201 may correspond to a hardware configuration of the electronic device 200, and a right side thereof may correspond to a software configuration of the electronic device 200.

The memory 220 may include a first memory 221 (e.g., the first memory 110 of FIG. 1) and a second memory 223

(e.g., the second memory 120 of FIG. 1). The electronic device 200 may perform memory swapping using a first swap pool (e.g., the first swap pool 112 of FIG. 1) of the first memory 221 and a second swap pool (e.g., the second swap pool 121 of FIG. 1) of the second memory 223. The electronic device 200 may process a workload using the memory swapping.

The operating system 230 may include a characteristic monitor 231, a runtime system 232, a memory manager 233, and a swap backend 234. The characteristic monitor 231 may monitor various pieces of information related to memory swapping. For example, the characteristic monitor 231 may monitor a QoS of a workload, system efficiency, an access frequency of a page, and the like. The runtime system 232 may dynamically adjust a CMS size based on the monitored information. The memory manager 233 may perform memory management through swapping-in of pages and/or swapping-out of pages. The swap backend 234 may provide primitive functions invokable by each backend (e.g., a CMS backend and a disk swap backend). For example, the primitive functions may include load, store, invalidate, and shrink.

The characteristic monitor 231, the runtime system 232, the memory manager 233, and the swap backend 234 are only examples of components for performing memory management; memory management may be performed by other components, other arrangements, etc. In addition, respective operations of the characteristic monitor 231, the runtime system 232, the memory manager 233, and the swap backend 234 may be considered as an operation of the operating system 230, an operation of the processor 210, and an operation of the electronic device 200, respectively. In addition, even when an operation is described as an operation of one of the characteristic monitor 231, the runtime system 232, the memory manager 233, or the swap backend 234 according to examples, the corresponding operation may be performed by another one or more of the characteristic monitor 231, the runtime system 232, the memory manager 233, and the swap backend 234.

FIG. 3 illustrates an example of operations of memory swapping including adjustment of a swap pool size, swapping-out, and swapping-in, according to one or more embodiments. Referring to FIG. 3, in operation 301, an electronic device adaptively adjusts at least a portion of a distribution state of a first memory for tasks and a size of a first swap pool based on a QoS of the tasks and/or a system efficiency (e.g., system throughput) according to execution of the tasks. The first swap pool may be a CMS pool. The electronic device may adaptively adjust the size of the first swap pool using other information in addition to the QoS and the system efficiency. For example, such other information may include execution of the tasks and a load according to execution of the tasks. The size adjustment of the first swap pool may be performed while the first memory is continuously operating (i.e., dynamically during ongoing operations of the workload and the operating system). For example, read and/or write operations of the first memory may be performed to execute the tasks of the workload. The size of the first swap pool may be adjusted while such read and/or write operations of the first memory are continuously performed.

There may be different operation modes for adjusting the size of the first swap pool. For example, there may be an adaptation mode and an idle mode. The electronic device may adjust the distribution state of the first memory and the size of the first swap pool while alternately being in the adaptation mode and the idle mode. In the adaptation mode, the electronic device may determine (adjust) an adaptive distribution state of the first memory and an adaptive pool size of the first swap pool based on a change of the QoS and/or the system efficiency performed according to the adjustment of the distribution state of the first memory and the size of the first swap pool. In the idle mode, the electronic device may change the QoS and/or the system efficiency while operating the first memory and the first swap pool in the adaptive distribution state with the adaptive pool size. The adaptation mode may again be entered/performed based on the change of the QoS and/or the system efficiency.

The tasks may include a first task of a type having a required QoS level and a second task of a type not having the required QoS level. In order to determine the adaptive distribution state of the first memory and the adaptive pool size of the first swap pool, the electronic device may, in response to a first QoS of the first task satisfying a first required QoS level of the first task, explore (e.g., test) a first adaptive memory size of a first partial space of the first task while reducing a size of the first partial space in the first memory for the first task, and the electronic device may, in response to the first QoS not satisfying the first required QoS level (as changed according to the adjustment of the first adaptive memory size), explore a first adaptive pool size of the first task while adjusting a size of a first partial pool in the first swap pool for the first task. To determine the adaptive distribution state of the first memory and the adaptive pool size of the first swap pool, the electronic device may determine a second adaptive memory size of a second partial space in the first memory for the second task based on a difference between a size of the first memory and the first adaptive memory size of the first partial space, and may explore a second adaptive pool size of the second task while adjusting a size of a second partial pool in the first swap pool for the second task so that the system efficiency increases and yet the electronic device is in a state where the first QoS satisfies the first required QoS level.

In order to adaptively adjust the distribution state of the first memory and/or the size of the first swap pool, the electronic device may, in response to the size of the first swap pool being required to be reduced, select a victim page from among pages stored in the first swap pool, and may perform eviction on the victim page. When the size of the first swap pool is required to be reduced, the victim page may be selected in a most advantageous manner in terms of memory efficiency. In order to perform the eviction on the victim page, the electronic device may, in response to the victim page being a duplicated page, perform invalidation on the victim page, and may, in response to the victim page not being a duplicated page, store the victim page in the second swap pool. The second swap pool may be a disk swap pool.

When the victim page is a duplicated page, the victim page is stored in both the main memory space and the first swap pool, and therefore the victim page in the first swap pool may lose effectiveness due to the invalidation on the victim page, and only the victim page in the main memory space may have effectiveness. In this case, as the size of the first swap pool decreases, the victim page in the first swap pool may be removed, and data of the victim page may be maintained in the main memory space. When the victim page is not a duplicated page, the victim page may be moved from the first swap pool to the second swap pool, thus reducing the size of the first swap pool without losing the data of the victim page.

In operation 302, based on the adaptive distribution state of the first memory and/or the adaptive pool size of the first swap pool, the electronic device performs either (i) swap-out of a first page of the tasks from the main memory space to the first swap pool or the second swap pool or (ii) swap-in of a second page of the tasks from the first swap pool or the second swap pool to the main memory space. The electronic device may, for swap-out of the first page, based on a characteristic of the first page, select a storage location (target swap pool) for storing the first page, and the storage location (target swap pool) may be selected from among the first swap pool and the second swap pool. The first page may be swapped-out based on the selected storage location. The first swap pool may store pages in a compressed state.

In order to select the storage location for storing the first page, the electronic device may determine a first score of the first page based on the characteristic of the first page, the first swap pool, and/or the second swap pool, and may then select the storage location for the first page according to a result of comparing the first score to a first threshold value. For the selection of the storage location, hotness of the first page, a compression ratio of the first page, performance of the first swap pool, an available space of the first swap pool, and/or the like may be considered. The hotness may indicate a page access frequency. The performance of the first swap pool may include a latency or bandwidth for compression and decompression. The first score may be determined to be high, as the hotness of the first page is high, as the compression ratio of the first page is high, as the performance of the first swap pool is high, and/or as the available space of the first swap pool is large.

The electronic device may, based on a characteristic of the second page, the first swap pool, and/or the second swap pool, determine a swap-in type of the second page regarding whether to store the second page in a duplicated manner, i.e., whether to store the second page in both the main memory space and the swap pool (either the first swap pool or the second swap pool), and may perform the swap-in of the second page based on the determined swap-in type of the second page. The swap-in type may include a duplicate storage type and a single storage type. According to the duplicate storage type, the second page may be stored in the main memory space and the swap pool in a duplicated manner, and according to the single storage type, the second page may be stored solely in the main memory space. According to the single storage type, the second page in the second swap pool may be invalidated.

In order to determine the swap-in type of the second page, the electronic device may, based on the characteristic of the second page, the first swap pool, and/or the second swap pool, determine a second score of the second page, and may determine a swap-in type of the second page according to a result of comparing the second score of the second page to a second threshold value. For the determination of the swap-in type, hotness of the second page, a compression ratio of the second page, performance of a swap pool (the first swap pool or the second swap pool) storing the second page, an available space of the swap pool storing the second page, and/or the like may be considered. The second store may be determined to be high, as the hotness of the second page is high, as the compression ratio of the second page is high, as the performance of the swap pool storing the second page is low, and as the available space of the swap pool storing the second page is large.

The electronic device may, in response to the swap-in of the second page occurring due to a memory fault in the main memory space (due to a write operation on the second page), determine (set) the swap-in type of the second page as a single storage type for the main memory space. In a case where the second page is stored in both the main memory space and the swap pool (the first swap pool or the second swap pool) in a duplicated manner according to the duplicate storage type, even if the swap-out of the second page is required, an operation of the swap-out of the second page from the main memory to the swap-pool may be omitted, since the second page is already stored in the swap pool. Instead of the operation of the swap-out of the second page from the main memory space to the swap pool, an operation of invalidating the second page in the main memory space may be performed. The omission of the swap-out operation may be limitedly applied in a case where data of the second page is retained.

When the data of the second page is not retained but is changed in the main memory space, swap-out of the changed second page from the main memory space to the swap pool may be required. Such a change of the data of the second page may occur from a write operation. More specifically, the operation related to the second page may be requested for a processing of any task through a processor. If there is no second page in the main memory space, a memory fault may occur, and the second page may be swapped into the main memory space. The data of the second page may or may not be changed according to an operation result of the processor. When the operation related to the second page is a write operation on the second page, the data of the second page may be changed. When the data of the second page is changed, the changed second page needs to be additionally swapped out, and therefore, an effect of setting the second page as the duplicate storage type may be obtained. When the swap-in of the second page is performed according to the write operation on the second page, the swap-in type of the second page may be determined as the single storage type.

Figure 4:
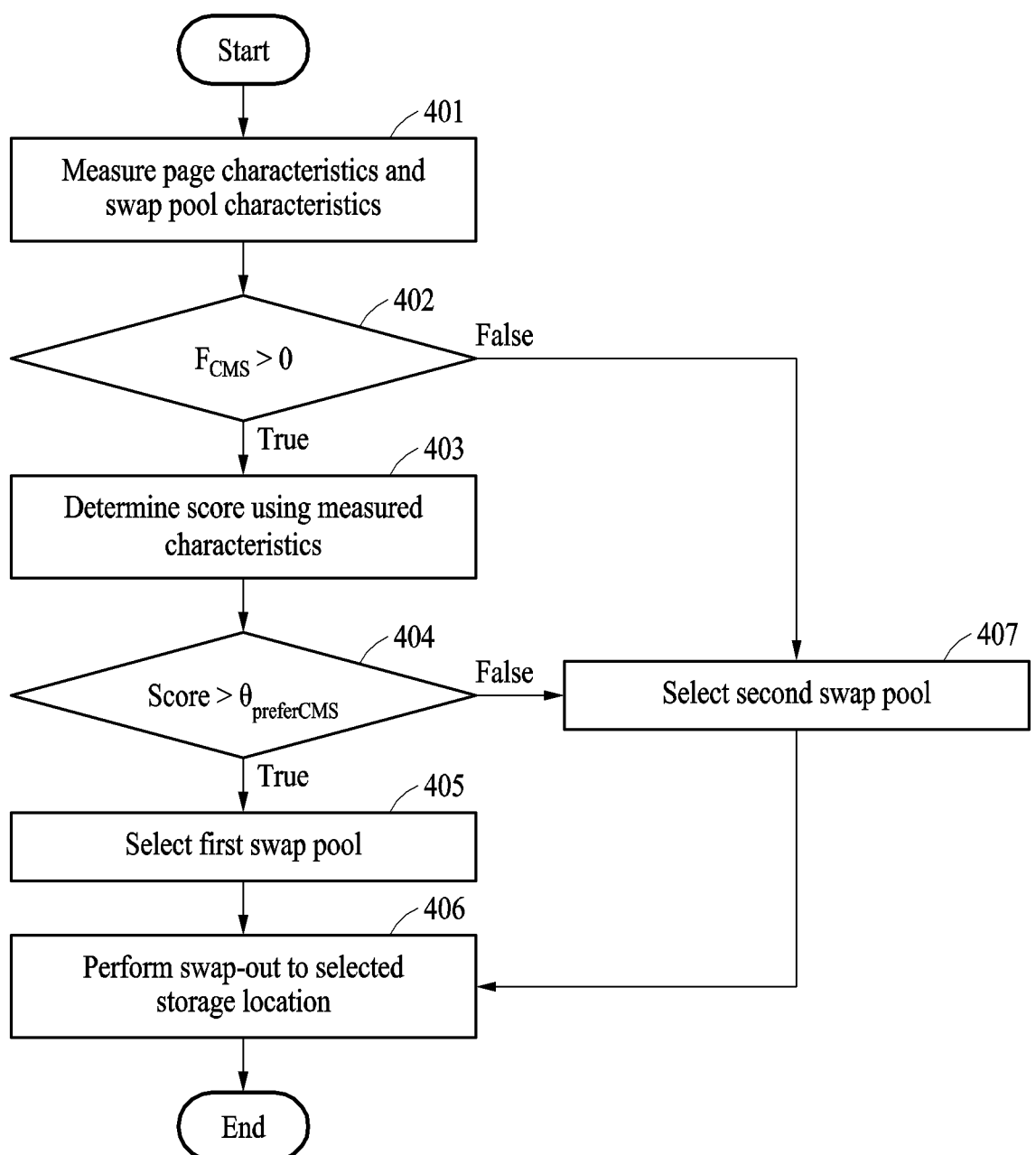
FIG. 4 illustrates an example of a swap-out operation, according to one or more embodiments.

FIG. 4 illustrates an example of a swap-out operation, according to one or more embodiments. Referring to FIG. 4, in operation 401, the electronic device measures page characteristics and swap pool characteristics. The page characteristics may include hotness and/or a compression ratio. The swap pool characteristics may include performance and/or available space of a swap pool. In operation 402, the electronic device may confirm whether available (free) space $F_{CMS}$ exists in the first swap pool. When available space $F_{CMS}$ exists, in operation 403, the electronic device may determine a score using the measured characteristics. In operation 404, the electronic device may compare the score to a threshold value $\theta_{preferCMS}$. When the score is greater than the threshold value $\theta_{preferCMS}$, in operation 405, the electronic device may select the first swap pool as the storage location. When available space $F_{CMS}$ does not exist in the first swap pool or the score is smaller than the threshold value $\theta_{preferCMS}$, in operation 407, the electronic device may select the second swap pool as the storage location. In operation 406, the electronic device may perform the swap-out to the selected storage location.

According to an example, the swap-out operation may be performed according to Table 1 below.

TABLE 1

```
01:   procedure doSwapOut(task, page)
02:       H ← getPageHotness(task, page)
03:       R ← getPageCompressionRatio(task, page)
04:       P_CMS ← getCompressedMemorySwapPerformance(task, page)
05:       F_CMS ← getCompressedMemorySwapFreeSize( )
```

TABLE 1-continued

```
06:     if F_CMS > 0 and preferCompressedMemorySwap(H, R, P_CMS,
        F_CMS) = true then
07:         B ← compressedMemorySwap
08:     else
09:         B ← diskSwap
10:     writeToSwap(page, B)
``` doSwapOut(task, page) is a function that perform swap-out of (task, page). A particular task of a workload may be specified through the "task" parameter, and a particular page for the corresponding task may be specified through the "page" parameter. getPageHotness(task, page) is a function that obtains hotness of (task, page), and getPageCompressionRatio(task, page) is a function that obtains a compression ratio of (task, page). getCompressedMemorySwapPerformance(task, page) is a function that obtains performance of a first swap pool storing (task, page), and getCompressedMemorySwapFreeSize( ) is a function that obtains the available space of a first swap pool. The obtained data may be stored as hotness H, a compression rate R, performance $P_{CMS}$, and an available space $F_{CMS}$.

The performance of the first swap pool may include a latency or bandwidth for compression and decompression. Pages may be stored in the first swap pool in a compressed state and may be decompressed when loaded from the first swap pool. The performance of the first swap pool may indicate a degree of latency that occurs in such compression and decompression and/or at what bandwidth such compression and decompression may be performed. A high value for the performance of the first swap pool may imply that the latency is low and the bandwidth is great at the time of the compression and the decompression. As the performance of the first swap pool is high, the benefit of using the first pool is great, and therefore, it may be applied as a factor to increase the score.

preferCompressedMemorySwap(H, R, $P_{CMS}$, $F_{CMS}$) is a function that returns an indication of whether the first swap pool is being selected as the storage location according to inputs of the hotness H, the compression ratio R, the performance $P_{CMS}$, and the available space $F_{CMS}$. B is a backend, compressedMemorySwap is a first swap pool, and diskSwap is a second swap pool. The storage location may be specified as the first swap pool or the second swap pool through the backend B.

When the available space $F_{CMS}$ is greater than 0 and a return value of preferCompressedMemorySwap(H, R, $P_{CMS}$, $F_{CMS}$) is true, the first swap pool is selected as the storage location. When the available space $F_{CMS}$ is smaller than 0 or the return value of preferCompressedMemorySwap(H, R, $P_{CMS}$, $F_{CMS}$) is false, the second swap pool is selected as the storage location. write ToSwap(page, B) is a function that stores the page in B.

According to an example, the storage location may be selected with instructions (code) configured as described with pseudocode in Table 2 below.

TABLE 2

```
01:     procedure preferCompressedMemorySwap(H, R, P_CMS, F_CMS)
02:         score ← α · H + β · R + γ_CMS · P_CMS + δ_CMS · F_CMS
03:         if score > θ_preferCMS then
04:             return true
05:         else
06:             return false
```

The score (shown in Table 2) may be determined according to the hotness H, the compression ratio R, the performance $P_{CMS}$, and the available space $F_{CMS}$. $\alpha$, $\beta$, $\gamma_{CMS}$, and $\delta_{CMS}$ are weights for a linear combination of the score factors. $\theta_{preferCMS}$ is a threshold value. When the score is greater than the threshold value $\theta_{preferCMS}$, the function returns "true", and when the score is smaller than the threshold value $\theta_{preferCMS}$, "false" is returned. The weights $\alpha$, $\beta$, $\gamma_{CMS}$, and $\delta_{CMS}$ and the threshold value $\theta_{preferCMS}$ may be determined as values that maximize the system efficiency while satisfying the QoS, and may be determined through experiments, heuristics, models, or the like.

Figure 5:
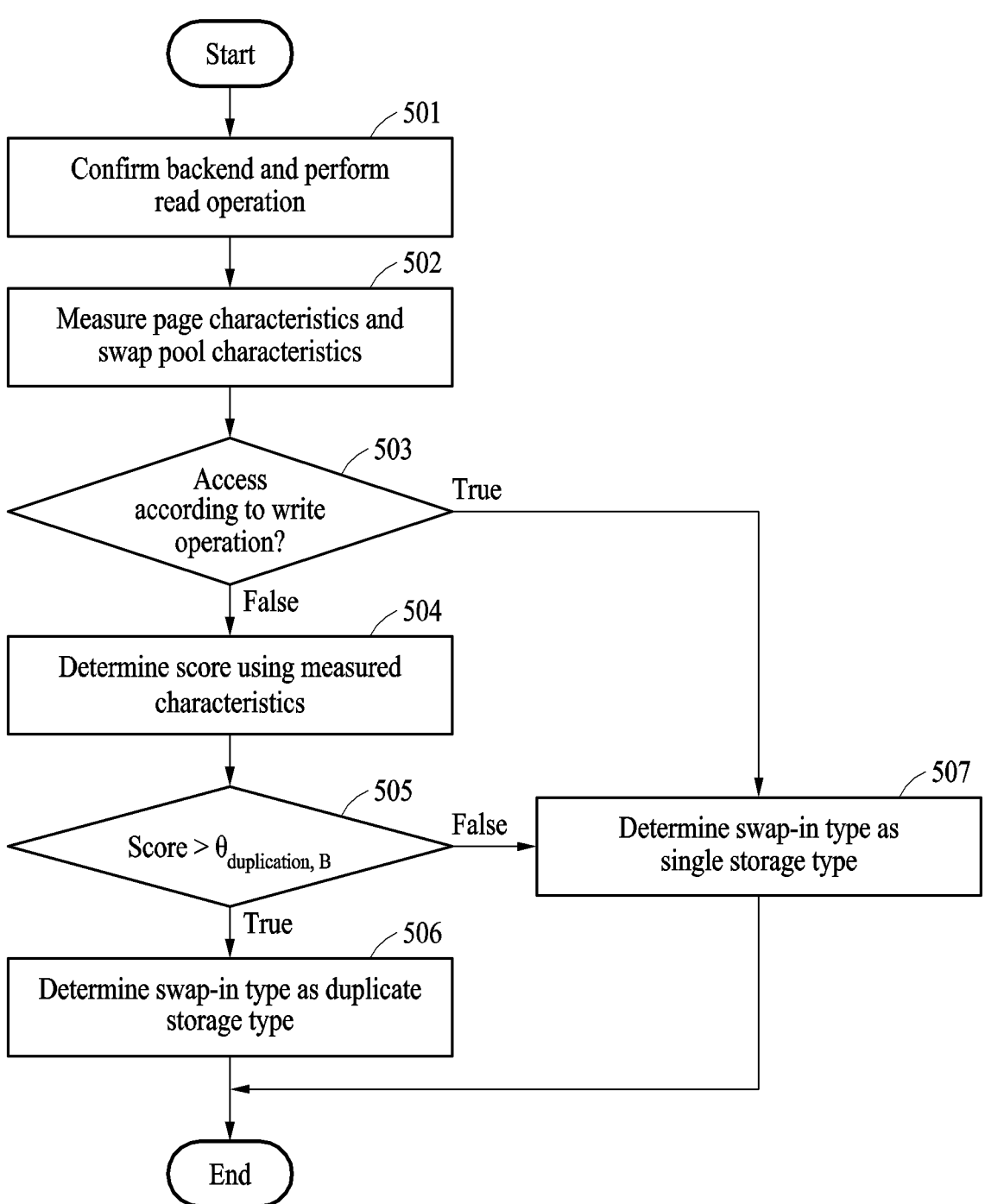
FIG. 5 illustrates an example of a swap-in operation, according to one or more embodiments.

FIG. 5 illustrates an example of a swap-in operation, according to one or more embodiments. Referring to FIG. 5, in operation 501, the electronic device confirms a backend and performs a read operation. The backend may be the first swap pool or the second swap pool. The read operation related to the confirmed backend may be performed. The swap-in may be performed as a result of the read operation. In operation 502, the electronic device measures page characteristics and swap pool characteristics. The page characteristics may include hotness and/or a compression ratio. The swap pool characteristics may include performance and/or available space of a swap pool.

In operation 503, the electronic device may confirm whether the swap-in is access according to the write operation. When it is not an access according to the write operation, in operation 504, the electronic device may determine a score using the measured characteristics. In operation 505, the electronic device may compare the score to a threshold value $\theta_{duplication,B}$. When the score is greater than the threshold value $\theta_{duplication,B}$, in operation 506, the electronic device may determine (set) the swap-in type as the duplicate storage type. When the swap-in is the access according to the write operation or the score is smaller than the threshold value $\theta_{duplication,B}$, in operation 507, the electronic device may determine (set) the swap-in type as the single storage type. The electronic device may perform the swap-in according to the determined swap-in type.

According to an example, the swap-in operation may be performed by code configured as described by the pseudocode in Table 3 below.

TABLE 3

```
01:     procedure doSwapIn(task, page, accessType)
02:         B ← getSwapBackend(page)
03:         readFromSwap(page, B)
04:         H ← getPageHotness(task, page)
05:         R ← getPageCompressionRatio(page)
06:         P_B ← getSwapBackendPerformance(page, B)
07:         F_B ← getSwapBackendFreeSize(B)
08:         if accessType = WRITE or preferDuplication(B, H, R, P_B, F_B) =
            false then
09:             invalidate(page)
``` doSwapIn(task, page, access Type) is a function that performs swap-in of (task, page, access Type). A particular task of a workload may be specified through the "task" parameter, a particular page for the corresponding task may be specified through "page" parameter, and an access type of doSwapIn may be specified through the "accessType" parameter. getSwapBackend(page) is a function that confirms a backend storing page, and the readFromSwap(page, B) is a function that performs a read operation of (page, B). B represents a backend of the page, which may be the first swap pool or the second swap pool.

getPageHotness(task, page) is a function that obtains hotness of (task, page), getPageCompressionRatio(page) is a function that obtains a compression ratio of (page), getCompressedMemorySwapPerformance(page, B) is a function that obtains performance of the backend B storing page, and getCompressedMemorySwapFreeSize(B) is a function that obtains an available space of the backend B. The obtained data may be stored as hotness H, compression rate R, performance $P_B$, and available space $F_B$.

WRITE represents a write operation. preferDuplication (B, H, R, $P_B$, $F_B$) is a function that returns an indication of whether a swap-in type is suitable for being set as the duplicate storage type, as determined according to inputs of the backend B, the hotness H, the compression ratio R, the performance $P_B$, and the available space $F_B$. When the access type corresponds to the write operation or a return value of preferDuplication(B, H, R, $P_B$, $F_B$) is false, invalidate(page) may be performed. invalidate(page) is a function that invalidates a page.

According to an example, the swap-in type may be determined by instructions (code) configured as described by the pseudocode in Table 4.

TABLE 4

```
01:    procedure preferDuplication(B, H, R, P_B, F_B)
02:        score ← α · H + β · R − γ_B · P_B + δ_B · F_B
03:        if score > θ_duplication,B then
04:            return true
05:        else
06:            return false
```

The score may be determined according to the backend B, the hotness H, the compression ratio R, the performance $P_B$, and the available space $F_B$. $\alpha$, $\beta$, $\gamma_B$, and $\delta_B$ are weights. $\theta_{duplication,B}$ is a threshold value. When the score is greater than the threshold value $\theta_{duplication,B}$, true may be returned, and when the score is smaller than the threshold value $\theta_{duplication,B}$, false may be returned. The weights $\alpha$, $\beta$, $\gamma_B$, and $\delta_B$ and the threshold value $\theta_{duplication,B}$ may be determined as values that maximize the system efficiency while satisfying the QoS through experiments, heuristics, models, or the like.

Figure 6:
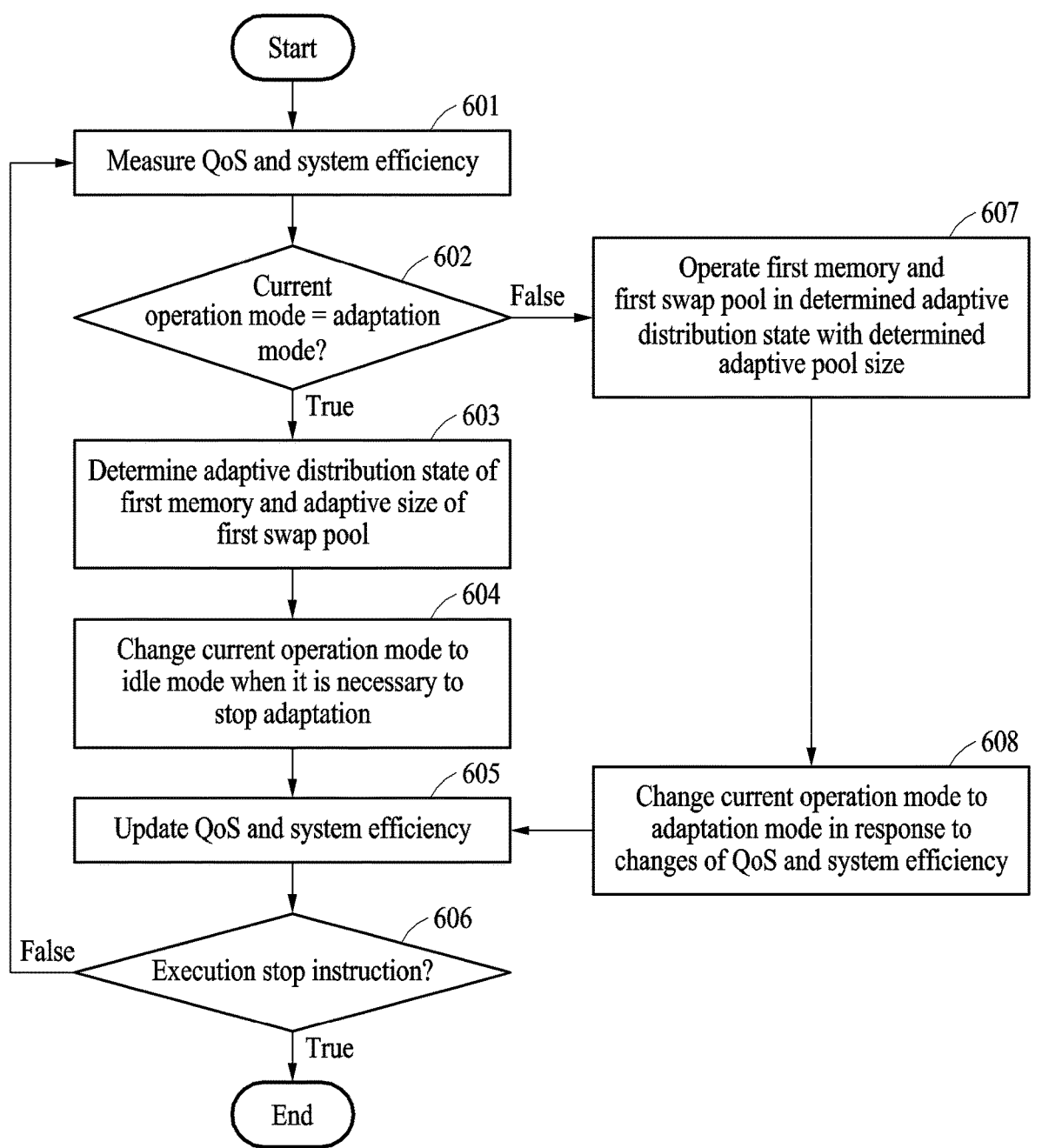
FIGS. 6 to 8 illustrate examples of operations of adaptive adjustment of a distribution state of a first memory and a size of a first swap pool, according to one or more embodiments.
Figure 7A:
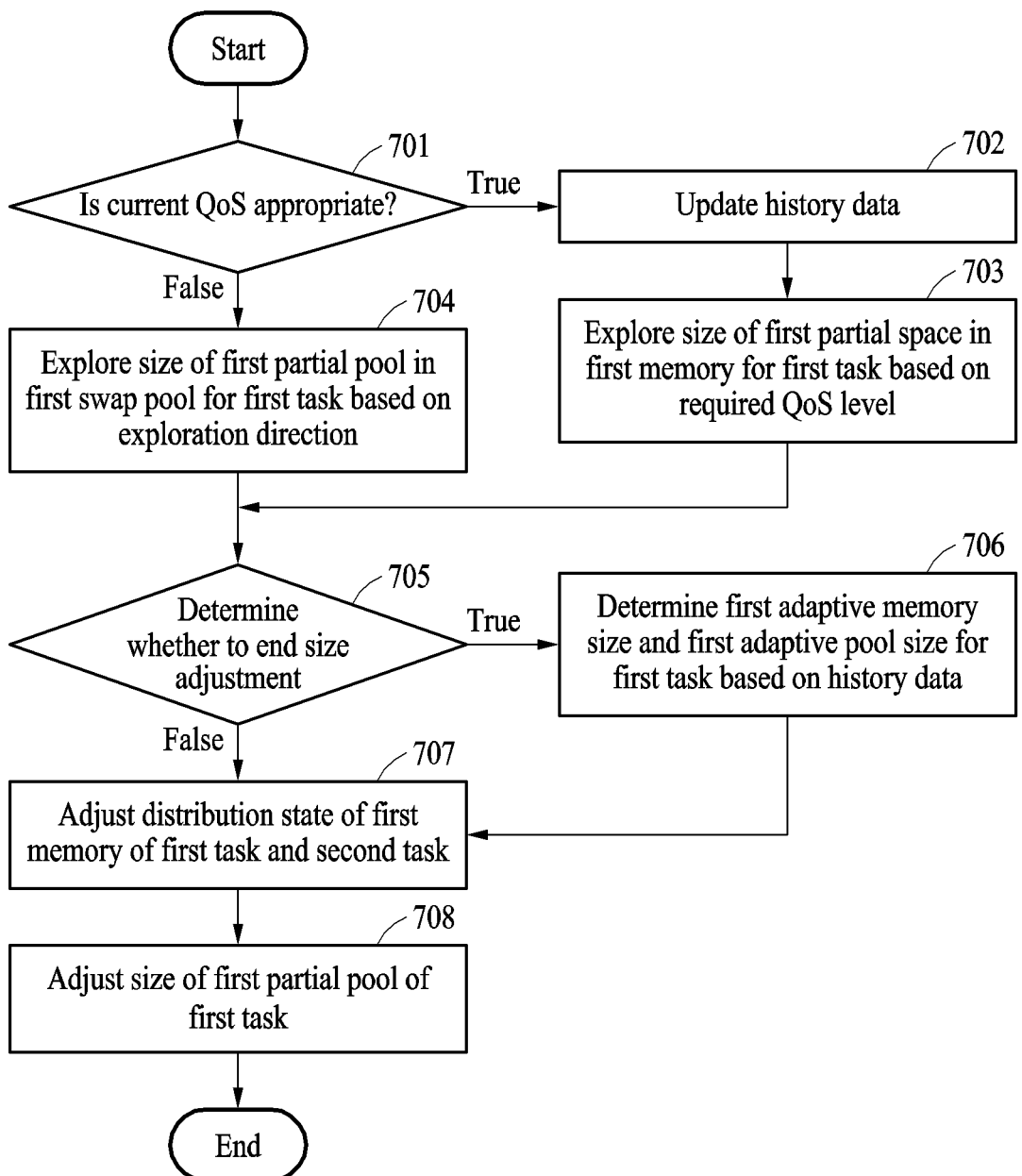
Figure 7B:
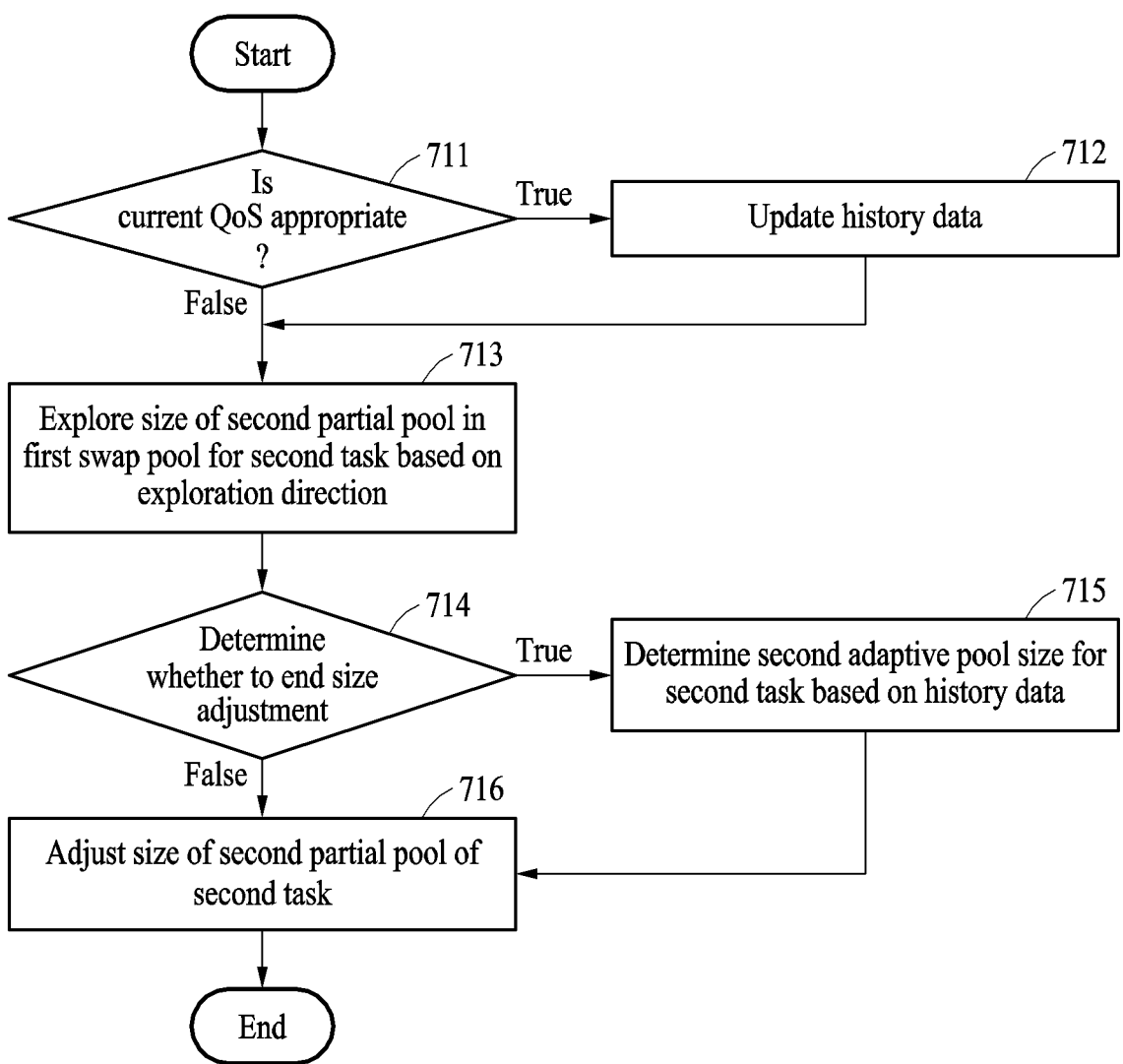
Figure 8:
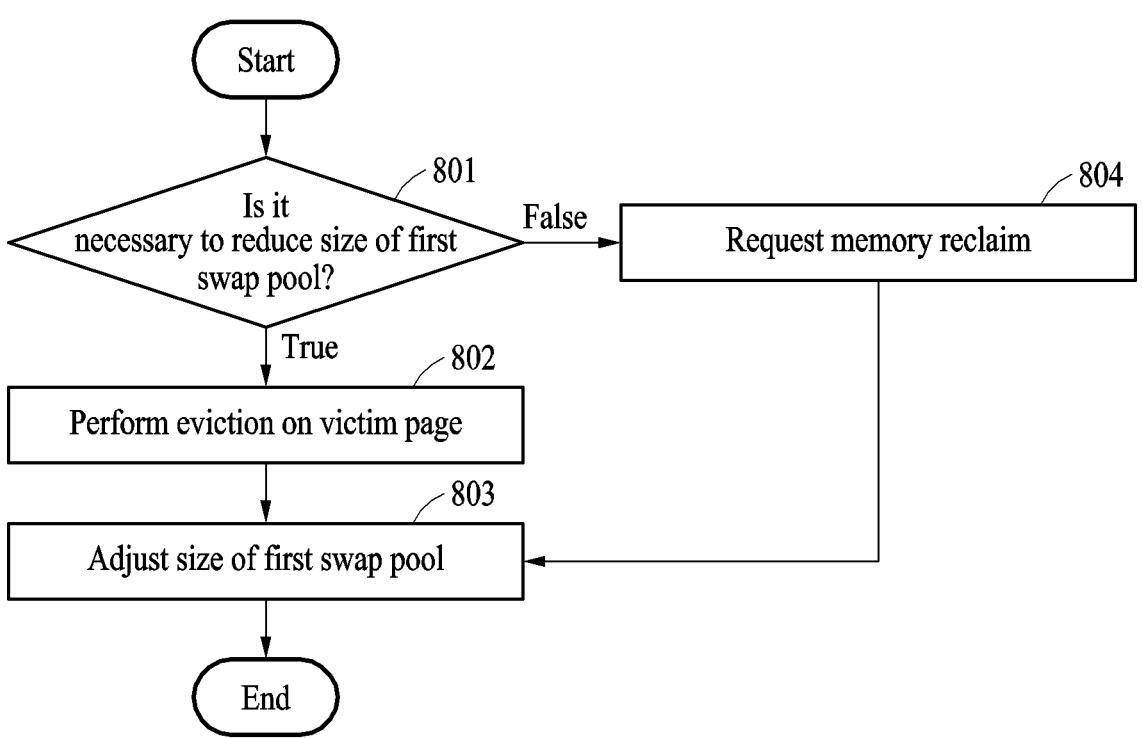

FIGS. 6 to 8 illustrate examples of operations of adaptive adjustment of a distribution state of a first memory and a size of a first swap pool, according to one or more embodiments. Referring to FIG. 6, in operation 601, the electronic device may measure a QoS and system efficiency. The electronic device may further measure a system load. In operation 602, the electronic device confirms whether a current operation mode is an adaptation mode.

When the current operation mode is the adaptation mode, in operation 603, the electronic device determines an adaptive distribution state of the first memory and an adaptive size of the first swap pool, and may do so based on a change of the QoS and/or the system efficiency according to (resulting from) the adjustment of the distribution state of the first memory and the size of the first swap pool. The electronic device may further consider the system load in determining the adaptive distribution state and the adaptive pool size. In operation 604, the electronic device may change the current operation mode to an idle mode when it is necessary to stop adaptation. As described again below, when a change in a size $M_{LC}$ of the first partial space stops, when a change in a size $S_{LC}$ of the first partial pool stops, or when the system efficiency decreases, an adaptation stop identifier (stopSubPhase) is substituted with a true value and the adaptation may thus be stopped. In operation 605, the electronic device may update the QoS and the system efficiency. The electronic device may further update the system load.

When the current operation mode is the idle mode (i.e., is not the adaptation mode, at operation 602), operation 607 is performed, and the electronic device may operate the first memory and the first swap pool in the determined adaptive distribution state and with the determined adaptive pool size. In operation 608, the electronic device may change the current operation mode to the adaptation mode in response to the changes of the QoS and the system efficiency. When the changes of the QoS and/or the system efficiency are great (e.g., above suitable threshold values), the electronic device may change the current operation mode to the adaptation mode.

In operation 606, the electronic device may determine whether there is an execution stop instruction. According to the execution stop, the adjustment of the distribution state of the first memory and the adjustment of the size of the first swap pool are stopped. When there is no execution stop instruction, the electronic device may perform operation 601 again. The electronic device may determine the adaptive size of the first swap pool while repeatedly performing operations 601, 602, 603, 604, and 605 until the current operation mode is changed to the idle mode through operation 604.

According to an example, the distribution state of the first memory and the size of the first swap pool may be adjusted by instructions (code) configured according to the pseudocode in Table 5.

TABLE 5

```
01:    global variables
02:        T_LC; T_Batch;
03:        L_prev; L_curr; ΔL
04:        M_LC,curr; M_LC,next
05:        S_LC,curr; S_LC,next; S_Batch,curr; S_Batch,next
06:        Q_prev; Q_curr; ΔQ
07:        E_prev; E_curr; ΔE
08:        H; phase; subphase; d
09:        CMSAdaptationCount: stopSubphase
10:    procedure Main
11:        T_LC ← getLatencyCriticalTask( )
12:        T_Batch ← getBatchTask( )
13:        initVariables( )
14:        phase ← adaptation; subphase ← exploreMemorySize
15:        while true do
16:            M_LC,curr ← M_LC,next
17:            S_LC,curr ← S_LC,next; S_Batch,curr ← S_Batch,next
18:            sleep(t_measure)
19:            L_curr ← measureLoad( )
20:            Q_curr ← measureQoS( )
21:            E_curr ← measureEfficiency( )
22:            ΔL ← L_curr − L_prev; ΔQ ← Q_prev − Q_curr
23:            ΔE ← E_curr − E_prev
24:            if phase = adaptation then
25:                if subphase = exploreMemorySize then
26:                    exploreMemorySize( )
27:                else
28:                    exploreBatchCMSSize( )
29:            else
30:                idlePhase( )
31:            L_prev ← L_curr; Q_prev ← Q_curr; E_prev ← E_curr
```

Global variables are declared in the "global variables" section. $T_{LC}$ is identification information of a first task (e.g., an LC task) having a required QoS level, $T_{batch}$ is identification information of a second task (e.g., a batch task) not having the required QoS level, $L_{prev}$ is a previous load, $L_{curr}$ is a current load, $\Delta L$ is a load change, $M_{LC,curr}$ is a current size of a first partial space in a first memory for the first task, $M_{LC,next}$ is a next size of the first partial space, $S_{LC,curr}$ is a current size of a first partial pool in a first swap pool for the first task, $S_{LC,next}$ is a next size of the first partial pool, $S_{Batch,curr}$ is a current size of a second partial pool in the first memory for the second task, $S_{Batch,next}$ is a next size of the second partial pool, $Q_{prev}$ is a previous QoS, $Q_{curr}$ is a current QoS, $\Delta Q$ is a QoS change, $E_{prev}$ is previous system efficiency, $E_{curr}$ is current system efficiency, $\Delta E$ is a system efficiency change, $\vec{H}$ is history data, "phase" is a current operation mode, "subphase" is a current sub-operation mode, d is an exploring direction (e.g., increasing or decreasing), CMSadaptationCount is a count identifier, and stopSubphase is an adaptation stop identifier.

Main is a main function for the adaptive adjustment of the distribution state of the first memory and the size of the first swap pool. Until an execution stop instruction is received, the distribution state of the first memory and the size of the first swap pool may be repeatedly adjusted by Main. The identification information $T_{LC}$ of the first task and the identification information $T_{Batch}$ of the second task may be determined through getLatencyCriticalTask( ) and getBatch-Task( ). The getLatencyCriticalTask( ) function obtains the identification information $T_{LC}$ of the first task, and the getBatchTask( ) function obtains the identification information $T_{Batch}$ of the second task. Variables may be initialized through the initVariables( ) function. Initially, Main may set a current operation mode (phase) to the adaptation mode (adaptation), and may set a current sub-operation mode (subphase) to a memory size exploration mode (exploreMemorySize).

The "while true" do-loop is an infinite loop. The next size $M_{LC,next}$ of the first partial space may be assigned to the current size $M_{LC,curr}$ of the first partial space, the next size $S_{LC,next}$ of the first partial pool may be assigned to the current size $S_{LC,curr}$ of the first partial pool, and the next size $S_{Batch,next}$ of the second partial pool may be assigned to the current size $S_{Batch,curr}$ of the second partial pool. The sleep ($t_{measure}$) function that waits for a $t_{measure}$ amount of time taken for variable measurement. A load may be measured through measureLoad( ), a QoS may be measured through measureQoS( ), and system efficiency may be measured through measureEfficiency( ). The current load $L_{curr}$ may be set according to a value measured through measureLoad( ), the current QoS $Q_{curr}$ may be set according to a value measured through measureQoS( ), and the current system efficiency $E_{curr}$ may be set according to a value measured through measureEfficiency( ). The load change $\Delta L$ may be a determined difference between the current load $L_{curr}$ and the previous load $L_{prev}$, the QoS change $\Delta Q$ may be a determined difference between the current QoS $Q_{curr}$ and the previous QoS $Q_{prev}$, and the system efficiency change $\Delta E$ may be a determined difference between the current system efficiency $E_{curr}$ and the previous system efficiency $E_{prev}$.

When the current operation mode (phase) corresponds to the adaptation mode (adaptation) and the current sub-operation mode (subphase) corresponds to the memory size exploration mode (exploreMemorySize), exploreMemorySize( ) may be executed. exploreMemorySize( ) is a function that determines a size of a first partial space in a first memory for a first task, a size of a second partial space in the first memory for a second task, and a size of a first partial pool in a first swap pool for the first task. A distribution state of the first memory may be determined through the size of the first partial space and the size of the second partial space. When the current operation mode (phase) corresponds to the adaptation mode (adaptation) and the current sub-operation mode (subphase) does not correspond to the memory size exploration mode (exploreMemorySize), explore- BatchCMSSize( ) may be executed. exploreBatchCMSSize( ) is a function that determines a size of a second partial pool in the first memory for the second task.

When the current operation mode (phase) does not correspond to the adaptation mode (adaptation), idlePhase( ) may be executed. idlePhase( ) is a function that operates the first memory and the first swap pool in the adaptive distribution state with the adaptive pool size. When the operations of exploreMemorySize( ) exploreBatchCMSSize( ) or idle-Phase( ) end, the previous load $L_{prev}$ may be updated to the current load $L_{curr}$, the previous QoS $Q_{prev}$ may be updated to the current QoS $Q_{curr}$, and the previous system efficiency $E_{prev}$ may be updated to the current system efficiency $E_{curr}$.

According to an example, the variable initialization may be performed as described by the pseudocode in Table 6.

TABLE 6

| | |
|---|---|
| 01: | procedure initVariables( ) |
| 02: | $L_{prev} \leftarrow 0$; $L_{curr} \leftarrow 0$; $\Delta L \leftarrow 0$ |
| 03: | $M_{LC,curr} \leftarrow M_{max}$; $M_{LC,next} \leftarrow M_{max}$ |
| 04: | $S_{LC,curr} \leftarrow S_{init}$; $S_{LC,next} \leftarrow S_{init}$ |
| 05: | $S_{Batch,curr} \leftarrow S_{init}$; $S_{Batch,next} \leftarrow S_{init}$ |
| 06: | $Q_{prev} \leftarrow 0$; $Q_{curr} \leftarrow 0$; $\Delta Q \leftarrow 0$ |
| 07: | $E_{prev} \leftarrow 0$; $E_{curr} \leftarrow 0$; $\Delta E \leftarrow 0$ |
| 08: | $\vec{H} \leftarrow$ initBoundedBuffer(size=N, sortKey=efficiency) |
| 09: | d ← increase |
| 10: | CMSAdaptationCount ← 0 |
| 11: | stopSubphase ← false |

The previous load $L_{prev}$, the current load $L_{curr}$, the load change $\Delta L$, the previous QoS $Q_{prev}$, the current QoS $Q_{curr}$, the QoS change $\Delta Q$, the previous system efficiency $E_{prev}$, the current system efficiency $E_{curr}$, the system efficiency change $\Delta E$, and the count identifier CMSAdaptationCount may be initialized to 0. The current size $M_{LC,curr}$ of the first partial space in the first memory for the first task and the next size $M_{LC,next}$ of the first partial space may be initialized to a maximum memory size $M_{max}$. The maximum memory size $M_{max}$ may be preset as an appropriate value. An initial size $S_{init}$ may be input to the current size $S_{LC,curr}$ of the first partial pool in the first swap pool for the first task, the next size $S_{LC,next}$ of the first partial pool, the current size $S_{Batch,curr}$ of the second partial pool in the first memory for the second task, and the next size $S_{Batch,next}$ of the second partial pool. History data $\vec{H}$ may be initialized through initBoundedBuffer(size=N, sortKey=efficiency). initBound-edBuffer(size=N, sortKey=efficiency) may correspond to a function that generates a buffer having a size of N and sorting contents with system efficiency. The exploration direction d may be initialized as an increase direction. The adaptation stop identifier (stopSubphase) may be initialized to false. The history data $\vec{H}$ may store N states. Each state may be defined as $\vec{s}$={L, $M_{LC}$, $S_{LC}$, $S_{Batch}$, Q, E}. $\vec{s}$ is a state, L is a load, $M_{LC}$ is a size of the first partial space, $S_{LC}$ is a size of the first partial pool, $S_{Batch}$ is a size of the second partial pool, Q is a QoS, and E is system efficiency.

The electronic device may perform operation 603 according to FIGS. 7A and 7B. FIG. 7A corresponds to the memory size exploration mode (exploreMemorySize) of Table 5, and FIG. 7B corresponds to a second partial pool size exploration mode (exploreBatchCMSSize) of Table 5. The size of the first partial space for the first task, the size of the second partial space for the second task, and the size of the first partial pool for the first task may be explored through the memory size exploration mode (exploreMemorySize). The size of the second partial pool for the second task may be explored through the second partial pool size exploration mode (exploreBatchCMSSize).

Referring to FIG. 7A, in operation 701, the electronic device may determine whether a current QoS is appropriate. When a difference between the current QoS and a target QoS is smaller than a threshold value (e.g., $\theta_{QoS}$), the electronic device may determine that the current QoS is appropriate. In operation 702, the electronic device may update history data. The electronic device may store, in the history data: a state including a current load, a current size of the first partial space, a current size of the first partial pool, a current size of the second partial pool, a current QoS, and current system efficiency.

In operation 703, the electronic device explores the size of the first partial space in the first memory for the first task based on a required QoS level. When the QoS of the first task satisfies the required QoS level of the first task, the electronic device may explore a first adaptive memory size of the first partial space for the first task while reducing the size of the first partial space in the first memory for the first task. In operation 704, the electronic device explores a size of the first partial pool in the first swap pool for the first task based on an exploration direction. When the QoS of the first task does not satisfy the required QoS level according to the adjustment of the first adaptive memory size, the electronic device may explore the first adaptive pool size of the first task while adjusting the size of the first partial pool in the first swap pool for the first task.

In operation 705, the electronic device determines whether to end the size adjusting. When the adaptation stop identifier (stopSubphase) is true, the size adjusting may end. When the adaptation stop identifier (stopSubphase) is true, in operation 706, the electronic device may determine the first adaptive memory size and the first adaptive pool size for the first task based on the history data. According to an example, the electronic device may select, from the history data, a first adaptive memory size and a first adaptive pool size of a state having highest system efficiency.

In operation 707, the electronic device adjusts a distribution state of the first memory of the first task and the second task. When the size adjustment is in progress, the size of the first partial space for the first task may be determined according to an intermediate result of the process of exploring the size of the first partial space, and the size of the second partial space for the second task may be determined based on a difference between the size of the first memory and the size of the first partial space. When the size adjustment ends, the size of the first partial space may be determined according to the first adaptive memory size corresponding to an exploration result, and a second adaptive memory size of the second partial space may be determined based on a difference between the size of the first memory and the first adaptive memory size. The distribution state of the first memory may correspond to the size of the first partial space and the size of the second partial space.

In operation 708, the size of the first partial pool of the first task is adjusted. When the size adjustment is in progress, the size of the first partial pool for the first task may be determined according to an intermediate result of the process of exploring the size of the first partial pool. When the size adjustment ends, the size of the first partial pool may be determined according to the first adaptive pool size corresponding to an exploration result.

According to an example, the distribution state of the first memory and the size of the first partial pool may be determined by instructions (code) configured as described by the pseudocode in Table 7 below.

TABLE 7

```
procedure exploreMemorySize( )
  if satisfyQoS(Q_curr) then
    H⃗.insert({L_curr, M_LC,curr, S_LC,curr, S_Batch,curr, Q_curr, E_curr})
    slack ← (Q_target − Q_curr) / Q_target
    if slack > 0 and slack < θ_slack
      M_LC,next ← M_LC,curr
    else
      M_LC,next ← max(M_LC,curr − memoryStepSize, M_min)
    if M_LC,next = M_LC,curr then
      stopSubphase ← true
  else
    if CMSAdaptationCount = 1 and ΔQ < 0 then
      d ← getOppositeDirection(d)
    S_LC,next ← getNextCMSSize(S_LC,curr)
    if S_LC,next = S_LC,curr then
      stopSubphase ← true
    CMSAdaptationCount ← CMSAdaptationCount + 1
  if stopSubphase = true then
    if H⃗ ≠ Ø then
      (M_LC,next, S_LC,next) ← getLCSizeWithMaxEfficiency(H⃗)
      d ← increase
      CMSAdaptationCount ← 0
      stopSubphase ← false
      subphase ← exploreBatchCMSSize
    else
      (M_LC,next, S_LC,next) ← (M_LC,curr, S_LC,curr)
      phase ← idle
  adjustMemorySize(T_LC, M_LC,next)
  adjustMemorySize(T_Batch, M_total − M_LC,next)
  adjustCMSSize(T_LC, S_LC,next)
``` exploreMemorySize( ) is a function that determines a size of the first partial space in the first memory for the first task, a size of the second partial space in the first memory for the second task, and a size of the first partial pool in the first swap pool for the first task. A minimum size of the first partial space that satisfies the QoS may be explored by adjusting the size of the first partial space and the size of the first swap pool for the first task through the memory size exploration mode (exploreMemorySize).

satisfyQoS($Q_{curr}$) is a function that determines whether the current QoS $Q_{curr}$ is appropriate. When a difference between the current QoS $Q_{curr}$ and a target QoS $Q_{target}$ is smaller than a threshold value (e.g., $\theta_{QoS}$), it may be determined that the current QoS $Q_{curr}$ is appropriate. The current QoS $Q_{curr}$ being appropriate may imply that the current QoS $Q_{curr}$ satisfies conditions of the QoS, and the current QoS $Q_{curr}$ being inappropriate may imply that the current QoS $Q_{curr}$ violates the conditions of the QoS. The target QoS $Q_{target}$ and the conditions of the QoS may be determined according to characteristics of a workload and/or a task.

When the current QoS $Q_{curr}$ is appropriate, the history data $\vec{H}$ may be updated and the size of the first partial space may be explored. $\vec{H}$.insert($\{L_{curr}, M_{LC,curr}, S_{LC,curr}, S_{Batch,curr}, Q_{curr}, E_{curr}\}$) is a function that inserts, into the history data $\vec{H}$: the current load $L_{curr}$, the current size $M_{LC,curr}$ of the first partial space, the current size $S_{LC,curr}$ of the first partial pool, the current size $S_{Batch,curr}$ of the second partial pool, the current QoS $Q_{curr}$, and the current system efficiency $E_{curr}$. When satisfyQoS($Q_{curr}$) is true, the current load $L_{curr}$, the current size $M_{LC,curr}$ of the first partial space, the current size $S_{LC,curr}$ of the first partial pool, the current size $S_{Batch,curr}$ of the second partial pool, the current QoS $Q_{curr}$, and the current system efficiency $E_{curr}$ may be inserted, as one state, into the history data $\vec{H}$.

slack is a remaining ratio from the current QoS $Q_{curr}$ to the target QoS $Q_{target}$. The remaining ratio (slack) may be determined based on the current QoS $Q_{curr}$ and the target QoS $Q_{target}$. When the remaining ratio (slack) is greater than 0 and the remaining ratio (slack) is smaller than a threshold value $\theta_{slack}$, the current size $M_{LC,curr}$ of the first partial space may be determined as the next size $M_{LC,next}$ of the first partial space. Accordingly, the current size $M_{LC,curr}$ of the first partial space may be the same as the next size $M_{LC,next}$ of the first partial space. The current size $M_{LC,curr}$ of the first partial space being the same as the next size $M_{LC,next}$ of the first partial space may correspond to an adaptation stop condition. Since changing of the size of the first partial space is stopped, the exploration of the size of the first partial space may end.

When the remaining ratio (slack) is smaller than 0 or the remaining ratio (slack) is greater than the threshold value $\theta_{slack}$, a new value may be set as the next size $M_{LC,next}$ of the first partial space. The new value may correspond to a larger value among a value obtained by subtracting memoryStep-Size from the current size $M_{LC,curr}$ of the first partial space and a minimum memory size $M_{min}$. The minimum memory size $M_{min}$ may be preset as an appropriate value. When the current size $M_{LC,curr}$ of the first partial space is the same as the next size $M_{LC,next}$ of the first partial space, the adaptation stop identifier (stopSubphase) may be set as true.

When the current QoS $Q_{curr}$ is inappropriate, the size of the first partial pool may be explored. A size of the first partial pool that satisfies the QoS may be explored from the current size $M_{LC,curr}$ of the first partial space. The exploration direction of exploring the size may be set according to measurement data (e.g., a QoS) in a case where the count identifier (CMSAdaptationCount) has a value of 0 and may be set to measurement data (e.g., a QoS) in a case where the count identifier (CMSAdaptationCount) has a value of 1. The exploration direction of exploring the size may be maintained as an increase direction that is set initially or may be changed to a decrease direction through the opposite setting.

When the value of the count identifier (CMSAdaptation-Count) is 1 and the QoS change $\Delta Q$ is less than 0, the exploration direction d may be reversed. A case where the value of the count identifier (CMSAdaptationCount) is 1 may correspond to a situation in which the initial QoS change $\Delta Q$ according to the change of the size of the first partial pool may be confirmed, and when the QoS decreases from the beginning, the increase of the QoS may be achieved by reversing the exploration direction d. getOppositeDirection(d) is a function that reverses the exploration direction d. The next size $S_{LC,next}$ of the first partial pool may be set according to a return value of getNextCMSSize($S_{LC,curr}$). getNextCMSSize($S_{LC}$,curr) is described below. When the current size $S_{LC,curr}$ of the first partial pool is the same as the next size $S_{LC,next}$ of the first partial pool, the adaptation stop identifier (stopSubphase) may be set as true. For the next exploration time, the count identifier (CMSAdaptation-Count) may be increased by 1.

When the adaptation stop identifier (stopSubphase) is set as true, a first adaptive memory size of the first partial space for the first task and a first adaptive pool size of the first partial pool for the first task may be determined. getLCSize-WithMaxEfficiency($\vec{H}$) is a function that obtains the current size $M_{LC,curr}$ of the first partial space and the current size $S_{LC,curr}$ of the first partial pool in a state having highest system efficiency from the history data $\vec{H}$. When the history data $\vec{H}$ is not a null set, the next size $M_{LC,next}$ of the first partial space and the next size $S_{LC,next}$ of the first partial pool may be set according to a value obtained through getLC-SizeWithMaxEfficiency($\vec{H}$), and the first adaptive memory size of the first partial space and the first adaptive pool size of the first partial pool may be set accordingly. At this time, the exploration direction d may be initialized to the increase direction, the count identifier (CMSAdaptationCount) may be initialized to 0, the adaptation stop identifier (stopSub-phase) may be initialized to false, and the current sub-operation mode (subphase) may be set to the second partial pool size exploration mode (exploreBatchCMSSize).

When the history data $\vec{H}$ is a null set, the next size $M_{LC,next}$ of the first partial space and the next size $S_{LC,next}$ of the first partial pool may be set according to the current size $M_{LC,curr}$ of the first partial space and the current size $S_{LC,curr}$ of the first partial pool. A case in which the history data $\vec{H}$ is a null set may be different from a case in which the history data $\vec{H}$ is not a null set, in that the data is not extracted from the history data $\vec{H}$. In this case, as the current operation mode (phase) is switched to the idle mode (idle), the first memory and the first swap pool may be operated with the current size $M_{LC,curr}$ of the first partial space and the current size $S_{LC,curr}$ of the first partial pool without the second partial pool size exploration mode (exploreBatchCMSSize).

According to adjustMemorySize($T_{LC}$, $M_{LC,next}$), a physi-cal size of the first partial space for the first task identified by the identification information $T_{LC}$ may be adjusted to the next size $M_{LC,next}$ of the first partial space. According to adjustMemorySize($T_{Batch}$, $M_{total}$–$M_{LC,next}$), a physical size of the second partial space for the second task identified by the identification information $T_{Batch}$ may be adjusted to a value obtained by subtracting the next size $M_{LC,next}$ of the first partial space from a total memory size $M_{total}$. The total memory size $M_{total}$ is a total size of a memory space allocated for the first task and the second task. According to adjustCMSSize($T_{LC}$, $S_{LC,next}$), a physical size of the first partial pool for the first task identified by the identification information $T_{LC}$ may be adjusted to the next size $S_{LC,next}$ of the first partial pool.

According to an example, the next size of the first partial pool may be determined by instructions (code) configured as described by the pseudocode in Table 8 below.

TABLE 8

| 01: | procedure getNextCMSSize($S_{curr}$) |
|---|---|
| 02: | if CMSAdaptationCount = 0 then |
| 03: | if $S_{curr}$ + CMSStepSize > $S_{max}$ then |
| 04: | d ← getOppositeDirection(d) |
| 05: | if d = increase then |
| 06: | return min($S_{curr}$ + CMSStepSize, $S_{max}$) |
| 07: | else |
| 08: | return max($S_{curr}$ − CMSStepSize, $S_{min}$) | getNextCMSSize($S_{curr}$) is a function that converts a value for a next size $S_{next}$ (e.g., the next size $S_{LC,next}$ of the first partial pool) according to a current size $S_{curr}$ (e.g., the current size $S_{LC,curr}$ of the first partial pool). When the count identifier (CMSAdaptationCount) has a value of 0 and the sum of the current size $S_{curr}$ and CMSStepSize is greater than a maximum pool size $S_{max}$, the exploration direction d may be reversed. The maximum pool size $S_{max}$ may be preset as an appropriate value. CMSStepSize is a size adjustment width. When the exploration direction d corre-sponds to an increase direction, a smaller value among the sum of the current size $S_{curr}$ and CMSStepSize, and the maximum size $S_{max}$ may be returned. When the exploration direction d is not the increase direction, a larger value among a value obtained by subtracting CMSStepSize from the current size $S_{curr}$, and a minimum size $S_{min}$ may be returned.

Referring to FIG. 7B, in operation 711, the electronic device may confirm whether the current QoS is appropriate. In operation 712, the electronic device may update the history data. The electronic device may store a state including the current load, the current size of the first partial space, the current size of the first partial pool, the current size of the second partial pool, the current QoS, and the current system efficiency in the history data. In operation 713, the electronic device explores the size of the second partial pool in the first swap pool for the second task based on the exploration direction. The electronic device may explore a second adaptive pool size of the second task while adjusting the size of the second partial pool in the first swap pool for the second task so that the system efficiency increases in a state where the QoS of the first task satisfies the required QoS level.

In operation 714, the electronic device determines whether to end the size adjustment. When the adaptation stop identifier (stopSubphase) is true or when the change of the size $S_{Batch}$ of the second partial pool is stopped, the size adjustment may end. When the size adjustment ends, in operation 715, the electronic device may determine the second adaptive pool size for the second task based on history data. According to an example, the electronic device may select the second adaptive pool size in a state having the highest system efficiency from the history data.

In operation 716, the size of the first partial pool of the second task is adjusted. When the size adjustment is in progress, the size of the second partial pool for the second task may be determined according to an intermediate result of the process of exploring the size of the second partial pool. When the size adjustment ends, the size of the second partial pool may be determined according to the second adaptive pool size corresponding to an exploration result.

According to an example, the size of the second partial pool may be determined by instructions (code) configured as described by the pseudocode in Table 9 below.

TABLE 9

```
01:     procedure exploreBatchCMSSize( )
02:        if satisfyQoS(Q_curr) then
03:           H.insert({L_curr,M_LC,curr, S_LC,curr, S_Batch,curr, Q_curr, E_curr})
04:           if CMSAdaptationCount = 1 then
05:              if ΔE < 0 then
06:                 d ← getOppositeDirection(d)
07:           else if CMSAdaptationCount > 1 then
08:              if ΔE < 0 then
09:                 stopSubPhase ← true
10:           S_Batch,next ← getNextCMSSize(S_Batch,curr)
11:           if stopSubPhase = true or S_Batch,next = S_Batch,curr then
12:              S_Batch,next ← getBatchCMSSizeWithMaxEfficiency(H)
13:           phase ← idle
14:           adjustCMSSize(T_Batch, S_Batch,next)
15:           CMSAdaptationCount ← CMSAdaptationCount + 1
``` exploreBatchCMSSize( ) is a function that determines the size of the second partial pool in the first swap pool for the second task. The size of the second partial pool may be explored through the second partial pool size exploration mode (exploreBatchCMSSize) so that the system efficiency increases in a state where the QoS of the first task satisfies the required QoS level. Since the second task does not have the required QoS level, the required QoS level of the first task may be considered.

satisfyQoS($Q_{curr}$) is a function that determines whether the current QoS $Q_{curr}$ is appropriate. When the current QoS $Q_{curr}$ is appropriate, the history data $\vec{H}$ may be updated. $\vec{H}$.insert($\{L_{curr}, M_{LC,curr}, S_{LC,curr}, S_{Batch,curr}, Q_{curr}, E_{curr}\}$) may correspond to a function that inserts the current load $L_{curr}$, the current size $M_{LC,curr}$ of the first partial space, the current size $S_{LC,curr}$ of the first partial pool, the current size $S_{Batch,curr}$ of the second partial pool, the current QoS $Q_{curr}$, and the current system efficiency $E_{curr}$ to the history data $\vec{H}$.

The exploration direction of the size may be set according to measurement data (e.g., system efficiency) in a case where the count identifier (CMSAdaptationCount) has a value of 0 and measurement data (e.g., system efficiency) in a case where the count identifier (CMSAdaptationCount) has a value of 1. The exploration direction of the size may be maintained as the increase direction that is set initially or may be changed to the decrease direction through the opposite setting.

When the value of the count identifier (CMSAdaptationCount) is 1 and the system efficiency change $\Delta E$ is less than 0, the exploration direction d may be set in reverse. A case where the value of the count identifier (CMSAdaptationCount) is 1 may correspond to a situation in which the initial system efficiency change $\Delta E$ according to the change of the size of the second partial pool may be confirmed, and when the system efficiency decreases from the beginning, the increase of the system efficiency may be achieved by reversing the exploration direction d. getOppositeDirection(d) may correspond to a function that reverses the exploration direction d. A case where the value of the count identifier (CMSAdaptationCount) is greater than 1 may correspond to a situation in which the exploration is performed in the exploration direction d that is determined once, and the system efficiency change $\Delta E$ being less than 0 may imply that over-optimization is performed. In this case, the adaptation stop identifier (stopSubPhase) may be substituted with a true value and the adaptation may be stopped.

The next size $S_{Batch,next}$ of the second partial pool may be set according to a return value of getNextCMSSize ($S_{Batch,curr}$). The description of Table 8 will be applied for getNextCMSSize($S_{Batch,curr}$).

When the adaptation stop identifier (stopSubphase) is true or the next size $S_{Batch,next}$ of the first partial pool is the same as the current size s, the second adaptive pool size of the second partial pool for the second task may be determined.

getBatchCMSSizeWithMaxEfficiency($\vec{H}$) is a function that obtains the current size $S_{Batch,curr}$ of the second partial pool in a state having highest system efficiency from the history data $\vec{H}$. The next size $S_{Batch,next}$ of the first partial pool may be set according to a value obtained through getLCSizeWithMaxEfficiency($\vec{H}$), and the second adaptive pool size of the second partial pool may be set accordingly. The current operation mode (phase) may be set to the idle mode (idle).

According to adjustCMSSize($T_{Batch}, S_{Batch,next}$), a physical size of the second partial pool for the second task identified by the identification information $T_{Batch}$ may be adjusted to the next size $S_{Batch,next}$ of the second partial pool. For the next exploration time, the count identifier (CMSAdaptationCount) may be increased by 1.

According to an example, the idle mode may be performed by instructions (code) configured as described by the pseudocode in Table 10 below.

TABLE 10

| 01: | procedure idlePhase( ) |
|---|---|
| 02: | if \|ΔL\| > θ$_L$ or \|ΔQ\| > θ$_Q$ or \|ΔE\| > θ$_E$ then |
| 03: | initVariables( ) |
| 04: | phase ← adaptation |
| 05: | subphase ← exploreMemorySize | idlePhase( ) is a function that operates the first memory and the first swap pool with the adaptive size. When the load change ΔL is greater than a threshold value θ$_L$, the QoS change ΔQ is greater than a threshold value θ$_Q$, or the system efficiency change ΔE is greater than a threshold value θ$_E$, the variables may be initialized through initVariables( ), the current operation mode (phase) may be set to the adaptation mode (adaptation), and the current sub-operation mode (subphase) may be set to the memory size exploration mode (exploreMemorySize).

Referring to FIG. 8, in operation 801, the electronic device may confirm whether it is necessary to reduce the size of the first swap pool. When such size reduction is required, in operation 802, the electronic device may perform eviction on a victim page. The electronic device may select a victim page from pages stored in the first swap pool and perform eviction on the victim page. When the victim page is a duplicated page, the electronic device may invalidate the victim page. When the victim page is not a duplicated page, the electronic device may store the victim page in the second swap pool. When it is not necessary to reduce the size, that is, when it is necessary to increase the size, in operation 804, the electronic device may request memory reclaiming. In operation 803, the electronic device may adjust the size of the first swap pool.

According to an example, the size adjustment of the first swap pool may be performed by instructions (code) configured as described by the pseudocode in Table 11 below.

TABLE 11

| 01: | procedure adjustCMSSize(task, S$_{new}$) |
|---|---|
| 02: | S$_{curr}$ ← getCurrentCompressedMemorySwapSize(task) |
| 03: | if S$_{new}$ < S$_{curr}$ then |
| 04: | M ← S$_{curr}$ – S$_{new}$ |
| 05: | shrinkCompressedMemorySwap(task, M) |
| 06: | else if S$_{new}$ > S$_{curr}$ then |
| 07: | F$_{memory}$ ← getFreeMemorySize(task) |
| 08: | sizeToReclaim ← S$_{new}$ – S$_{curr}$ – F$_{memory}$ |
| 09: | If sizeToReclaim > 0 then |
| 10: | requestMemoryReclaim(task, sizeToReclaim) |
| 11: | compressedMemorySwap.setSize(task, S$_{new}$) | adjustCMSSize(task, S$_{new}$) is a function that physically adjusts the size of the partial pool of the first swap pool of the task according to a new size S$_{new}$. getCurrentCompressedMemorySwapSize(task) is a function that obtains a current size of the partial pool of the first swap pool of the task. A return value of getCurrentCompressedMemorySwapSize(task) may be stored as the current size S$_{curr}$. When the current size S$_{curr}$ is greater than the new size S$_{new}$, that is, when it is necessary to reduce the size of the first swap pool, the size may be adjusted through shrinkCompressedMemorySwap(task, M). shrinkCompressedMemorySwap(task, M) is a function that ensures a space for M bytes from the partial pool of the first swap pool. M is a difference between the current size S$_{curr}$ and the new size S$_{new}$.

When the new size S$_{new}$ is greater than the current size S$_{curr}$, that is, when it is necessary to increase the size of the first swap pool, the memory reclaiming may be requested.

getFreeMemorySize(task) is a function that returns a free space of the main memory space which may be added to the partial pool of the task. A return value of getFreeMemorySize(task) may be stored in the free space F$_{memory}$. A value obtained by subtracting the free space F$_{memory}$ from a value obtained by subtracting the current size S$_{curr}$ from the new size S$_{new}$ may be stored in a reclaim size (sizeToReclaim). When the reclaim size (sizeToReclaim) is greater than 0, the memory reclaiming request (to an operating system side) may be performed through requestMemoryReclaim(task, sizeToReclaim). requestMemoryReclaim(task, sizeToReclaim) is a function that requests an additional memory space by the reclaim size (sizeToReclaim). compressedMemorySwap.setSize(task, S$_{new}$) is a function that sets a portion of the first swap pool of the task to the new size S$_{new}$.

According to an example, the size reduction of the first swap pool may be performed by instructions (code) configured as described by the pseudocode in Table 12 below.

TABLE 12

| 01: | procedure shrinkCompressedMemorySwap(task, M) |
|---|---|
| 02: | victimPageList ← getVictimPages(task, M) |
| 03: | for page in victimPageList then |
| 04: | If isDuplicatedPage(page) = true then |
| 05: | invalidate(page) |
| 06: | else |
| 07: | decompress(page) |
| 08: | evictToDisk(page) | shrinkCompressedMemorySwap(task, M) is a function that ensures a space for M bytes from the partial pool of the first swap pool. getVictimPages(task, M) is a function that obtains victim pages for M bytes. Pages obtained by getVictimPages(task, M) may be stored in a list (victimPageList). The invalidation or eviction may be performed according to a type of each page of the list (victimPageList). isDuplicatedPage(page) is a function that returns whether the page corresponds to a duplicate storage type. When the page corresponds to the duplicate storage type, the page may be invalidated. When the page does not correspond to the duplicate storage type, that is, when the page corresponds to the single storage type, the page may be decompressed and stored in the second swap pool. invalidate(page) is a function that invalidates the page, decompress(page) is a function that decompresses the page, and evictToDisk(page) is a function that evicts the page to the second swap pool.

According to an example, the victim page may be selected by instructions (code) configured as described by the pseudocode in Table 13 below.

TABLE 13

| 01: | procedure getVictimPages(task, M) |
|---|---|
| 02: | candidatePageList ← getCandidatePages(task) |
| 03: | for page in candidatePageList then |
| 04: | H ← getPageHotness(page) |
| 05: | R ← getPageCompressionRatio(page) |
| 05: | P$_{CMS}$ ← getCompressedMemorySwapPerformance(page) |
| 06: | D ← isDuplicatedPage(page) |
| 07: | page.score ← calculateScore(H, R, P$_{CMS}$, D) |
| 08: | sortPageListByScore(candidatePageList) |
| 09: | return getLowScorePages(candidatePageList, M) | getVictimPages(task, M) is a function that obtains victim pages for M bytes. getCandidatePages(task) is a function that obtains candidate pages. In order to minimize overhead, a victim may be selected from the candidate pages instead of all pages of the first swap pool. The candidate pages may be determined based on an inactive list provided by the operating system. The candidate pages may be stored in a list (candidatePageList).

The victim page may be selected from each candidate page in the list (candidatePageList). The victim page may be selected based on a characteristic. getPageHotness(page) is a function that obtains hotness of the page, getPageCompressionRatio(page) is a function that obtains a compression ratio of the page, getCompressedMemorySwapPerformance (page) is a function that obtains performance of the first swap pool storing the page, and isDuplicatedPage(page) is a function that obtains whether the page corresponds to the duplicate storage type. The obtained data may be stored in terms of the hotness H, the compression ratio R, the performance $P_{CMS}$, and the duplicate type D.

calculateScore(H, R, $P_{CMS}$, D) is a function that converts a score according to the inputs of the hotness H, the compression ratio R, the performance $P_{CMS}$, and the duplicate type D. The score may be stored as page.score. sort-PageListByScore(candidatePageList) is a function that aligns (e.g., orders) the candidate pages of the list (candidatePageList) by scores. getLowScorePages(candidatePage-List, M) is a function that obtains the candidate pages for M bytes in order of the low scores from the candidate pages. The victim page may be selected through a return value of getLowScorePages(candidatePageList, M).

According to an example, the score may be determined by instructions (code) configured as described by the pseudo-code in Table 14 below.

TABLE 14

| 01: | procedure calculateScore(H, R, $P_{CMS}$, D) |
| 02: | score $\leftarrow \alpha \cdot H + \beta \cdot R + \gamma_{CMS} \cdot P_{CMS} + \epsilon \cdot D$ |
| 03: | return score |

The score may be determined according to the hotness H, the compression ratio R, the performance $P_{CMS}$, and the duplicate type D. $\alpha$, $\beta$, $\gamma_{CMS}$, and $\epsilon$ are weights.

Figure 9:
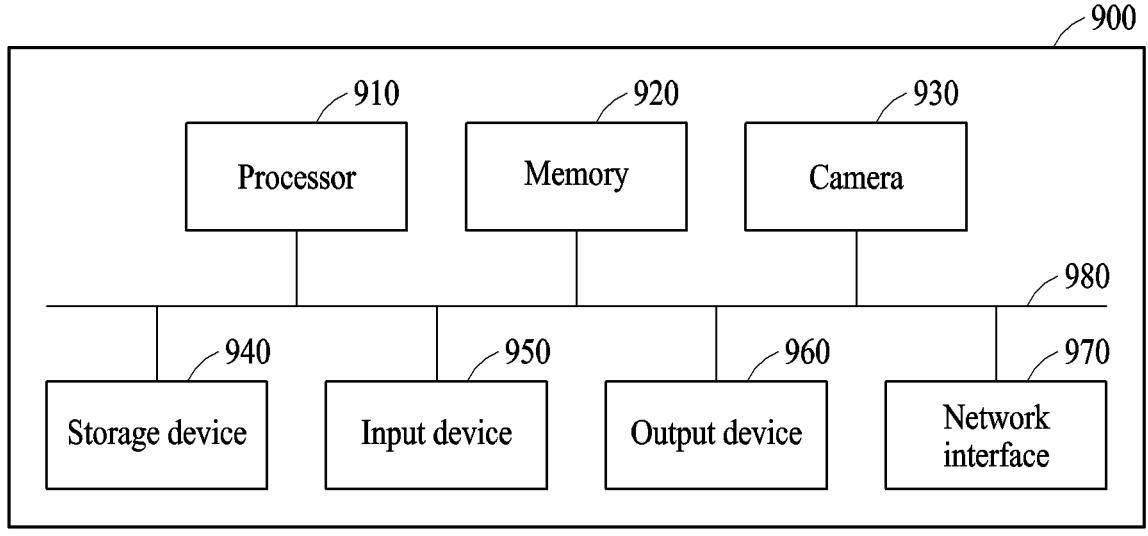
FIG. 9 illustrates example components of an electronic device, according to one or more embodiments.

FIG. 9 illustrates example components of an electronic device, according to one or more embodiments. Referring to FIG. 9, an electronic device 900 may include a processor 910, a memory 920, a camera 930, a storage device 940, an input device 950, an output device 960, and a network interface 970, and these components may communicate with one another through a communication bus 980. For example, the electronic device 900 may be embodied as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, a data center, etc.), a home appliance (e.g., a television (TV), a smart TV, a refrigerator, etc.), a security device (e.g., a door lock, etc.), or a vehicle (e.g., an autonomous vehicle, a smart vehicle, etc.). The electronic device 900 may include, structurally and/or functionally, the electronic device 200 of FIG. 2.

The processor 910 may execute instructions and functions in the electronic device 900. For example, the processor 910 may process instructions stored in the memory 920 or the storage device 940. The processor 910 may perform operations of FIGS. 1 to 8, 10, and 11. The memory 920 may include a non-transitory computer-readable storage medium or a non-transitory computer-readable storage device. The memory 920 may store instructions that are to be executed by the processor 910, and also store information associated with software and/or applications when the software and/or applications are being executed by the electronic device 900.

The camera 930 may capture a photo and/or a video. The storage device 940 may include a non-transitory computer-readable storage medium or a non-transitory computer-readable storage device. The storage device 940 may store a greater amount of information than the memory 920 and store the information for an extended period of time. For example, the storage device 940 may include magnetic hard disks, optical disks, flash memories, floppy disks, or other forms of non-volatile memories known in the art.

The input device 950 may receive an input from a user through a traditional input scheme using a keyboard and a mouse, and through a new input scheme such as a touch input, a voice input and, and an image input. For example, the input device 950 may detect an input from a keyboard, a mouse, a touchscreen, a microphone or a user, and may include any other device configured to transfer the detected input to the electronic device 900. The output device 960 may provide a user with an output of the electronic device 900 through a visual channel, an auditory channel, or a tactile channel. The output device 960 may include, for example, a display, a touchscreen, a speaker, a vibration generator, or any other device configured to provide a user with the output. The network interface 970 may communicate with an external device via a wired or wireless network.

Figure 10:
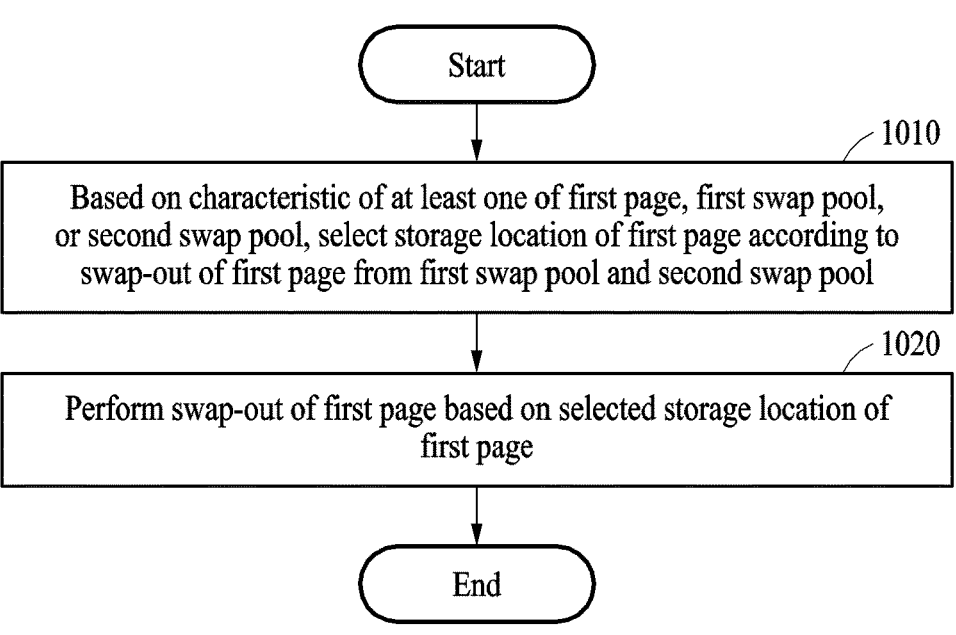
FIG. 10 illustrates an example swap-out operation, according to one or more embodiments.

FIG. 10 illustrates an example swap-out operation, according to one or more embodiments. An electronic device may include a first memory, a second memory, and a processor. The first memory may include a main memory space and a first swap pool. The second memory may be positioned farther (in terms of latency) from the processor than the first memory and may include a second swap pool.

Referring to FIG. 10, in operation 1010, the electronic device, based on a characteristic of at least one of a first page, the first swap pool, or the second swap pool, selects a storage location of the first page according to swap-out of the first page from the first swap pool and the second swap pool, and in operation 1020, the electronic device performs the swap-out of the first page based on the selected storage location of the first page.

In order to select the storage location of the first page, the processor may, based on the characteristic of the first page, the first swap pool, and/or the second swap pool, determine a first score of the first page, and may select the storage location of the first page according to a result of comparing the first score of the first page to a first threshold value. The first score may be determined to be high, as the hotness of the first page is high, as the compression ratio of the first page is high, as the performance of the first swap pool is high, and as the available space of the first swap pool is large.

In addition, the descriptions provided with reference to FIGS. 1 to 9, and FIG. 11 are generally applicable to the swap-out operation of FIG. 10.

Figure 11:
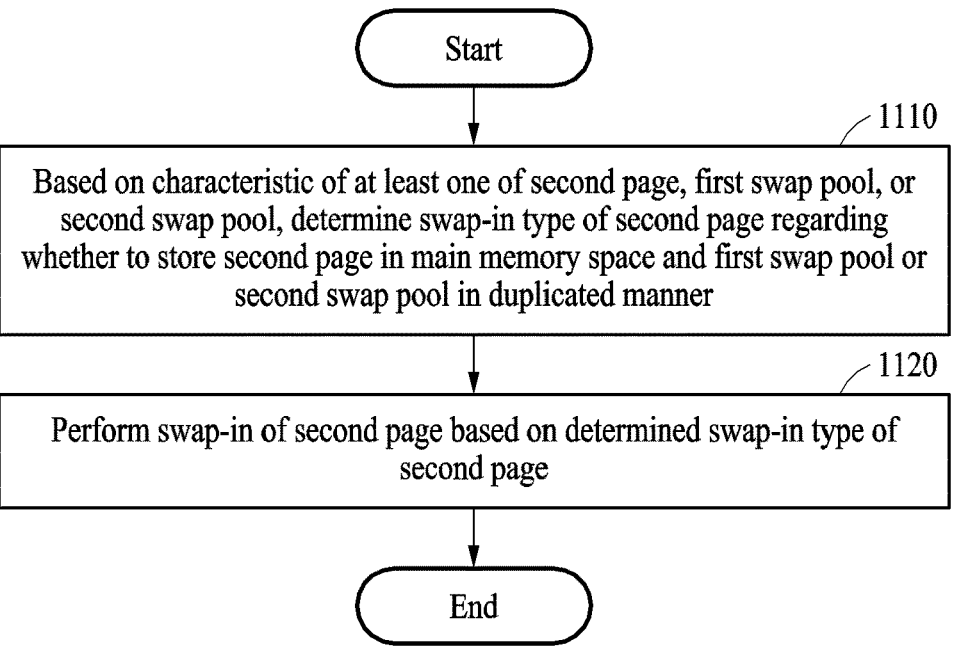
FIG. 11 illustrates an example swap-in operation, according to one or more embodiments.

FIG. 11 illustrates an example swap-in operation, according to one or more embodiments. An electronic device may include a first memory, a second memory, and a processor. The first memory may include a main memory space and a first swap pool. The second memory may be located farther from the processor than the first memory and may include a second swap pool.

Referring to FIG. 11, in operation 1110, the electronic device, based on a characteristic of a second page, the first swap pool, and/or the second swap pool, determines a swap-in type of the second page regarding whether to store the second page in the main memory space and the first swap pool or the second swap pool in a duplicated manner, and in operation 1120, the electronic device performs the swap-in of the second page based on the determined swap-in type of the second page.

In order to determine the swap-in type of the second page, the processor may, based on the characteristic of at least one of the second page, the first swap pool, or the second swap pool, determine a second score of the second page, and may determine the swap-in type of the second page according to a result of comparing the second score of the second page to a second threshold value. The second score may be determined to be high, as hotness of the second page is high, as a compression ratio of the second page is high, as performance of a swap pool storing the second page is low, and as an available space of the swap pool storing the second page is large.

In order to determine the swap-in type of the second page, the processor may, in response to the swap-in of the second page occurring due to a memory fault in the main memory space (according to a write operation on the second page), determine the swap-in type of the second page as a single storage type for the main memory space.

In addition, the descriptions provided with reference to FIGS. 1 to 10 are generally applicable to the swap-in operation of FIG. 11.

The computing apparatuses, the electronic devices, the processors, the memories, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of managing a virtual memory using a first memory comprising a main memory space and a first swap pool and a second memory comprising a second swap pool, the method comprising:

based on a quality of service (QoS) of tasks or on a system efficiency corresponding to execution of the tasks, adaptively adjusting a distribution state of the first memory or a size of the first swap pool; and based on the adaptively adjusted distribution state of the first memory or the adaptively adjusted size of the first swap pool, performing swap-out of a first page of the tasks from the main memory space to the first swap pool or the second swap pool or performing swap-in of a second page of the tasks from the first swap pool or the second swap pool to the main memory space.

2. The method of claim 1, wherein the performing of the swap-out of the first page or the swap-in of the second page comprises:

based on a characteristic of the first page, the first swap pool, or the second swap pool, selecting, from among the first swap pool and the second swap pool, a target swap pool of the first page for performing the swap-out of the first page; and performing the swap-out of the first page based on the selected target swap pool of the first page.

3. The method of claim 2, wherein the selecting of the target swap pool of the first page comprises:

based on the characteristic of the first page, the first swap pool, or the second swap pool, determining a first score of the first page; and selecting the target swap pool of the first page according to a result of comparing the first score of the first page to a first threshold value.

4. The method of claim 1, wherein the first swap pool comprises a compressed swap pool wherein pages are compressed when written to the first swap pool and wherein pages are decompressed when read from the first swap pool.

5. The method of claim 1, wherein the performing of the swap-out of the first page or the swap-in of the second page comprises:

based on a characteristic of the second page, the first swap pool, or the second swap pool, determining a swap-in type of the second page, the swap-in type corresponding to whether to duplicatively store the second page in the main memory space and in a swap pool which can be either the first swap pool or the second swap pool; and performing the swap-in of the second page based on the determined swap-in type of the second page.

6. The method of claim 5, wherein the determining of the swap-in type of the second page comprises:

based on the characteristic of the second page, the first swap pool, or the second swap pool, determining a second score of the second page; and determining the swap-in type of the second page according to a result of comparing the second score of the second page to a second threshold value, and wherein the second score is proportional to hotness of the second page, a compression ratio of the second page, and an available space of the swap pool storing the second page, and wherein the second score is inversely proportional to performance of a swap pool storing the second page.

7. The method of claim 5, wherein the determining of the swap-in type of the second page comprises:

in response to the swap-in of the second page occurring due to a memory fault in the main memory space caused by a write operation on the second page, determining the swap-in type of the second page to be a single-storage type for the main memory space.

8. The method of claim 1, wherein the adaptively adjusting the distribution state of the first memory or the size of the first swap pool comprises:

determining, in an adaptation mode, the adaptive distribution state of the first memory and the adaptive pool size of the first swap pool based on a change of the QoS and the system efficiency resulting from adjustment of the distribution state of the first memory and the size of the first swap pool;

monitoring, in an idle mode, a change of the QoS or the system efficiency while operating the first memory and the first swap pool in the adaptive distribution state with the adaptive pool size; and performing the adaptation mode again based on the change of the QoS or the system efficiency.

9. The method of claim 8, wherein the tasks comprise a first task having a required QoS level and a second task not having the required QoS level, and wherein the determining of the adaptive distribution state of the first memory and the adaptive pool size of the first swap pool comprises:

in response to a first QoS value of the first task satisfying the required QoS level of the first task, varying a first adaptive memory size of a first partial space of the first task while reducing a size of the first partial space in the first memory for the first task; and in response to the first QoS value not satisfying the required QoS level according to the varying of the first adaptive memory size, varying a first adaptive pool size of the first task while adjusting a size of a first partial pool in the first swap pool for the first task.

10. The method of claim 9, wherein the determining of the adaptive distribution state of the first memory and the adaptive pool size of the first swap pool comprises:

determining a second adaptive memory size of a second partial space in the first memory for the second task based on a difference between a size of the first memory and the first adaptive memory size of the first partial space; and varying a second adaptive pool size of the second task while adjusting a size of a second partial pool in the first swap pool for the second task so that the system efficiency increases in a state where the first QoS value satisfies the required QoS level.

11. The method of claim 1, wherein the adaptively adjusting of the distribution state of the first memory or the size of the first swap pool comprises:

in response to an indication that the size of the first swap pool is to be reduced, selecting a victim page from among pages stored in the first swap pool; and performing eviction on the victim page.

12. The method of claim 11, wherein the performing of the eviction on the victim page comprises:

based on whether the victim page is a duplicated page or not, determining whether to evict the victim page by performing invalidation on the victim page or whether to evict the victim page by storing the victim page in the second swap pool.

13. An electronic device comprising:

a processor and memory storing instructions configured to cause the processor to:

based on a quality of service (QoS) of tasks or on a system efficiency corresponding to execution of the tasks, adaptively adjust a portion of a distribution state of a first memory or a size of a first swap pool; and based on the adaptively adjusted distribution state of the first memory or the adaptively adjusted size of the first swap pool, perform swap-out of a first page of the tasks from the main memory space to the first swap pool or a second swap pool or perform swap-in of a second page of the tasks from the first swap pool or the second swap pool to the main memory space.

14. The electronic device of claim 13, wherein the instructions are further configured to cause the processor to, in order to perform the swap-out of the first page or the swap-in of the second page:

based on a characteristic the first page, the first swap pool, or the second swap pool, select, from among the first swap pool and the second swap pool, a target swap pool of the first page for performing the swap-out of the first page; and perform the swap-out of the first page based on the selected target swap pool of the first page.

15. The electronic device of claim 13, wherein pages are compressed when provided to the first swap pool and are decompressed when obtained from the first swap pool.

16. The electronic device of claim 13, wherein the instructions are further configured to cause the processor to, in order to perform the swap-out of the first page or the swap-in of the second page:

based on a characteristic of the second page, the first swap pool, or the second swap pool, determine a swap-in type of the second page, the swap-in type corresponding to whether to duplicatively store the second page in both the main memory space and either the first swap pool or the second swap pool; and perform the swap-in of the second page based on the determined swap-in type of the second page.

17. The electronic device of claim 13, wherein the instructions are further configured to cause the processor to, in order to adaptively adjust the distribution state of the first memory or the size of the first swap pool:

determine, in an adaptation mode, the adaptive distribution state of the first memory and the adaptive pool size of the first swap pool based on a change of the QoS or the system efficiency resulting from adjustment of the distribution state of the first memory and the size of the first swap pool;

monitor, in an idle mode, a change of the QoS or the system efficiency while operating the first memory and the first swap pool in the adaptive distribution state with the adaptive pool size; and perform the adaptation mode again based on the change of the QoS or the system efficiency.

18. The electronic device of claim 17, wherein the tasks comprise a first task having a required QoS level and a second task not having the required QoS level, and wherein the instructions are further configured to cause the processor to, to determine the adaptive distribution state of the first memory and the adaptive pool size of the first swap pool:

in response to a first QoS value of the first task satisfying the required QoS level of the first task, vary a first adaptive memory size of a first partial space of the first task while reducing a size of the first partial space in the first memory for the first task;

in response to the first QoS value not satisfying the required QoS level according to the adjustment of the first adaptive memory size, vary a first adaptive pool size of the first task while adjusting a size of a first partial pool in the first swap pool for the first task;

determine a second adaptive memory size of a second partial space in the first memory for the second task based on a difference between a size of the first memory and the first adaptive memory size of the first partial space; and explore a second adaptive pool size of the second task while adjusting a size of a second partial pool in the first swap pool for the second task so that the system efficiency increases in a state where the first QoS satisfies the first required QoS level.

19. The electronic device of claim 13, wherein the instructions are further configured to cause the processor to adaptively adjust the distribution state of the first memory or the size of the first swap pool by:

in response to an indication that the size of the first swap pool is to be reduced, select a victim page from among pages stored in the first swap pool; and perform eviction on the victim page.

* * * * *